(12) United States Patent
Raghavan et al.

(10) Patent No.: US 11,515,910 B2
(45) Date of Patent: Nov. 29, 2022

(54) BEAM TRAINING IN MILLIMETER WAVE RELAYS USING AMPLIFY-AND-FORWARD TRANSMISSIONS

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/457,775

(22) Filed: Dec. 6, 2021

(65) Prior Publication Data

US 2022/0094401 A1    Mar. 24, 2022

Related U.S. Application Data

(62) Division of application No. 16/889,150, filed on Jun. 1, 2020, now Pat. No. 1,196,464.

(Continued)

(51) Int. Cl.
*H04B 7/0417* (2017.01)
*H04B 7/0408* (2017.01)
(Continued)

(52) U.S. Cl.
CPC ......... *H04B 7/0417* (2013.01); *H04B 7/0408* (2013.01); *H04B 7/0695* (2013.01); *H04B 7/088* (2013.01)

(58) Field of Classification Search
CPC .. H04B 7/0408; H04B 7/0417; H04B 7/0426; H04B 7/0434; H04B 7/06; H04B 7/061;
(Continued)

(56) References Cited

U.S. PATENT DOCUMENTS 11,196,464 B2    12/2021  Raghavan et al.
2003/0218993 A1  11/2003  Moon et al.
(Continued)

FOREIGN PATENT DOCUMENTS

EP    2453589 A2    5/2012

OTHER PUBLICATIONS

International Search Report and Written Opinion—PCT/US2020/070323—ISA/EPO—dated Oct. 15, 2020.

*Primary Examiner* — Young T. Tse
(74) *Attorney, Agent, or Firm* — Harrity & Harrity LLP/Qualcomm Incorporated

(57) ABSTRACT

Various aspects of the present disclosure generally relate to wireless communication. A transmitter node and a relay node transmit, to a base station, feedback related to complex channel estimates associated with beam pairs providing viable paths for a first link between the transmitter node and the base station, a second link between the relay node and the base station, and a third link between the transmitter node and the relay node. The transmitter node transmits a signal to the base station using a transmit beam associated with a first beam pair and to the relay node using a transmit beam associated with a second beam pair. The base station receives the signal from the transmitter node and an estimate of the signal from the relay node via a receive beam configured based at least in part on the complex channel estimates included in the feedback. Numerous other aspects are provided.

30 Claims, 12 Drawing Sheets

Related U.S. Application Data

(60) Provisional application No. 62/897,761, filed on Sep. 9, 2019.

(51) Int. Cl.
*H04B 7/08* (2006.01)
*H04B 7/06* (2006.01)

(58) Field of Classification Search
CPC .. H04B 7/0613; H04B 7/0617; H04B 7/0619; H04B 7/0695; H04B 7/088
USPC ........ 375/259, 260, 262, 265, 267; 370/310, 370/310.1, 310.2, 326, 328–330, 334, 370/336, 343, 345; 455/500, 517, 522, 455/524, 525, 69, 70, 71
See application file for complete search history.

(56) References Cited

U.S. PATENT DOCUMENTS

| | | | |
|---|---|---|---|
| 2006/0050802 A1* | 3/2006 | Kim | H04B 7/0842 375/260 |
| 2007/0286303 A1 | 12/2007 | Yamaura | |
| 2013/0343211 A1 | 12/2013 | Liu et al. | |
| 2017/0134076 A1 | 5/2017 | Maamari et al. | |
| 2018/0006702 A1 | 1/2018 | Doostnejad et al. | |
| 2018/0019843 A1* | 1/2018 | Papasakellariou | H04L 1/1861 |
| 2018/0115958 A1 | 4/2018 | Raghavan et al. | |
| 2018/0191408 A1 | 7/2018 | Pi | |
| 2019/0199410 A1 | 6/2019 | Zhao et al. | |
| 2019/0288760 A1 | 9/2019 | Li et al. | |

\* cited by examiner

BEAM TRAINING IN MILLIMETER WAVE RELAYS USING AMPLIFY-AND-FORWARD TRANSMISSIONS

CROSS-REFERENCE TO RELATED APPLICATIONS

This Application is a divisional of U.S. patent application Ser. No. 16/889,150, filed on Jun. 1, 2020 (now U.S. Pat. No. 11,196,464), entitled "BEAM TRAINING IN MILLIMETER WAVE RELAYS USING AMPLIFY-AND-FORWARD TRANSMISSIONS," which claims priority to U.S. Provisional Patent Application No. 62/897,761, filed on Sep. 9, 2019, entitled "BEAM TRAINING IN MILLIMETER WAVE RELAYS USING AMPLIFY-AND-FORWARD TRANSMISSIONS," the contents of which are incorporated herein by reference in their entireties.

FIELD OF THE DISCLOSURE

Aspects of the present disclosure generally relate to wireless communication and to techniques and apparatuses for beam training in millimeter wave relays using amplify-and-forward transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a transmitter node, may include: transmitting, to a base station, feedback related to one or more beam training procedures, wherein the feedback includes a first complex channel estimate associated with a first beam pair providing a viable path for a first link between the transmitter node and the base station; configuring, based at least in part on the one or more beam training procedures, a second transmit beam associated with a second beam pair to be used on a second link between the transmitter node and a relay node that further communicates with the base station on a third link; and transmitting a signal to the base station using a first transmit beam associated with the first beam pair and to the relay node using the second transmit beam associated with the second beam pair to enable the base station to simultaneously receive the signal from the transmitter node and an estimate of the signal from the relay node via a base station receive beam, wherein the base station receive beam is configured based at least in part on the first complex channel estimate, a second complex channel estimate associated with the second beam pair, and a third complex channel associated with a third beam pair configured on the third link.

In some aspects, a method of wireless communication, performed by a relay node, may include: transmitting, to a base station, feedback related to one or more beam training procedures, wherein the feedback includes a first complex channel estimate associated with a first beam pair providing a viable path for a first link between a transmitter node and the relay node and a second complex channel estimate associated with a second beam pair providing a viable path for a second link between the relay node and the base station; receiving a signal from the transmitter node using a receive beam associated with the first beam pair; and transmitting an estimate of the signal to the base station using a transmit beam associated with the second beam pair to enable the base station to simultaneously receive the signal from the transmitter node and the estimate of the signal from the relay node via a base station receive beam, wherein the base station receive beam is configured based at least in part on the first complex channel estimate, the second complex channel estimate, and a third complex channel estimate associated with a third beam pair configured on a third link between the transmitter node and the base station.

In some aspects, a method of wireless communication, performed by a base station, may include: receiving feedback related to one or more beam training procedures, wherein the feedback includes a first complex channel estimate associated with a first beam pair providing a viable path for a first link between the base station and transmitter node, a second complex channel estimate associated with a second beam pair providing a viable path for a second link between the base station and a relay node, and a third complex channel estimate associated with a third beam pair providing a viable path for a third link between the transmitter node and the relay node; and receiving a signal from the transmitter node and an estimate of the signal from the relay node using a receive beam configured based at least in part on the first complex channel estimate, the second complex channel estimate, and the third complex channel estimate.

In some aspects, a transmitter node for wireless communication may include a memory and one or more processors operatively coupled to the memory. The memory and the one or more processors may be configured to: transmit, to a base station, feedback related to one or more beam training procedures, wherein the feedback includes a first complex channel estimate associated with a first beam pair providing a viable path for a first link between the transmitter node and the base station; configure, based at least in part on the one or more beam training procedures, a second transmit beam associated with a second beam pair to be used on a second link between the transmitter node and a relay node that further communicates with the base station on a third link; and transmit a signal to the base station using a first transmit beam associated with the first beam pair and to the relay node using the second transmit beam associated with the second beam pair to enable the base station to simultaneously receive the signal from the transmitter node and an estimate of the signal from the relay node via a base station receive beam, wherein the base station receive beam is configured based at least in part on the first complex channel estimate, a second complex channel estimate associated with the second beam pair, and a third complex channel associated with a third beam pair configured on the third link.

In some aspects, a relay node for wireless communication may include a memory and one or more processors operatively coupled to the memory. The memory and the one or more processors may be configured to: transmit, to a base station, feedback related to one or more beam training procedures, wherein the feedback includes a first complex channel estimate associated with a first beam pair providing a viable path for a first link between a transmitter node and the relay node and a second complex channel estimate associated with a second beam pair providing a viable path for a second link between the relay node and the base station; receive a signal from the transmitter node using a receive beam associated with the first beam pair; and transmit an estimate of the signal to the base station using a transmit beam associated with the second beam pair to enable the base station to simultaneously receive the signal from the transmitter node and the estimate of the signal from the relay node via a base station receive beam, wherein the base station receive beam is configured based at least in part on the first complex channel estimate, the second complex channel estimate, and a third complex channel estimate associated with a third beam pair configured on a third link between the transmitter node and the base station.

In some aspects, a base station for wireless communication may include a memory and one or more processors operatively coupled to the memory. The memory and the one or more processors may be configured to: receive feedback related to one or more beam training procedures, wherein the feedback includes a first complex channel estimate associated with a first beam pair providing a viable path for a first link between the base station and transmitter node, a second complex channel estimate associated with a second beam pair providing a viable path for a second link between the base station and a relay node, and a third complex channel estimate associated with a third beam pair providing a viable path for a third link between the transmitter node and the relay node; and receive a signal from the transmitter node and an estimate of the signal from the relay node using a receive beam configured based at least in part on the first complex channel estimate, the second complex channel estimate, and the third complex channel estimate.

In some aspects, a non-transitory computer-readable medium may store one or more instructions for wireless communication. The one or more instructions, when executed by one or more processors of a base station, may cause the one or more processors to: transmit, to a base station, feedback related to one or more beam training procedures, wherein the feedback includes a first complex channel estimate associated with a first beam pair providing a viable path for a first link between the transmitter node and the base station; configure, based at least in part on the one or more beam training procedures, a second transmit beam associated with a second beam pair to be used on a second link between the transmitter node and a relay node that further communicates with the base station on a third link; and transmit a signal to the base station using a first transmit beam associated with the first beam pair and to the relay node using the second transmit beam associated with the second beam pair to enable the base station to simultaneously receive the signal from the transmitter node and an estimate of the signal from the relay node via a base station receive beam, wherein the base station receive beam is configured based at least in part on the first complex channel estimate, a second complex channel estimate associated with the second beam pair, and a third complex channel associated with a third beam pair configured on the third link.

In some aspects, a non-transitory computer-readable medium may store one or more instructions for wireless communication. The one or more instructions, when executed by one or more processors of a base station, may cause the one or more processors to: transmit, to a base station, feedback related to one or more beam training procedures, wherein the feedback includes a first complex channel estimate associated with a first beam pair providing a viable path for a first link between a transmitter node and the relay node and a second complex channel estimate associated with a second beam pair providing a viable path for a second link between the relay node and the base station; receive a signal from the transmitter node using a receive beam associated with the first beam pair; and transmit an estimate of the signal to the base station using a transmit beam associated with the second beam pair to enable the base station to simultaneously receive the signal from the transmitter node and the estimate of the signal from the relay node via a base station receive beam, wherein the base station receive beam is configured based at least in part on the first complex channel estimate, the second complex channel estimate, and a third complex channel estimate associated with a third beam pair configured on a third link between the transmitter node and the base station.

In some aspects, a non-transitory computer-readable medium may store one or more instructions for wireless communication. The one or more instructions, when executed by one or more processors of a base station, may cause the one or more processors to: receive feedback related to one or more beam training procedures, wherein the feedback includes a first complex channel estimate associated with a first beam pair providing a viable path for a first link between the base station and transmitter node, a second complex channel estimate associated with a second beam pair providing a viable path for a second link between the base station and a relay node, and a third complex channel estimate associated with a third beam pair providing a viable path for a third link between the transmitter node and the relay node; and receive a signal from the transmitter node and an estimate of the signal from the relay node using a receive beam configured based at least in part on the first complex channel estimate, the second complex channel estimate, and the third complex channel estimate.

In some aspects, an apparatus for wireless communication may include: means for transmitting, to a base station, feedback related to one or more beam training procedures, wherein the feedback includes a first complex channel estimate associated with a first beam pair providing a viable path for a first link between the apparatus and the base station; means for configuring, based at least in part on the one or more beam training procedures, a second transmit beam associated with a second beam pair to be used on a second link between the apparatus and a relay node that further communicates with the base station on a third link; and means for transmitting a signal to the base station using a first transmit beam associated with the first beam pair and to the relay node using the second transmit beam associated with the second beam pair to enable the base station to simultaneously receive the signal from the apparatus and an estimate of the signal from the relay node via a base station receive beam, wherein the base station receive beam is configured based at least in part on the first complex channel estimate, a second complex channel estimate associated with the second beam pair, and a third complex channel associated with a third beam pair configured on the third link.

In some aspects, an apparatus for wireless communication may include: means for transmitting, to a base station, feedback related to one or more beam training procedures, wherein the feedback includes a first complex channel estimate associated with a first beam pair providing a viable path for a first link between a transmitter node and the apparatus and a second complex channel estimate associated with a second beam pair providing a viable path for a second link between the apparatus and the base station; means for receiving a signal from the transmitter node using a receive beam associated with the first beam pair; and means for transmitting an estimate of the signal to the base station using a transmit beam associated with the second beam pair to enable the base station to simultaneously receive the signal from the transmitter node and the estimate of the signal from the apparatus via a base station receive beam, wherein the base station receive beam is configured based at least in part on the first complex channel estimate, the second complex channel estimate, and a third complex channel estimate associated with a third beam pair configured on a third link between the transmitter node and the base station.

In some aspects, an apparatus for wireless communication may include: means for receiving feedback related to one or more beam training procedures, wherein the feedback includes a first complex channel estimate associated with a first beam pair providing a viable path for a first link between the apparatus and transmitter node, a second complex channel estimate associated with a second beam pair providing a viable path for a second link between the apparatus and a relay node, and a third complex channel estimate associated with a third beam pair providing a viable path for a third link between the transmitter node and the relay node; and means for receiving a signal from the transmitter node and an estimate of the signal from the relay node using a receive beam configured based at least in part on the first complex channel estimate, the second complex channel estimate, and the third complex channel estimate.

Aspects generally include a method, apparatus, system, computer program product, non-transitory computer-readable medium, user equipment, base station, transmitter node, relay node, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
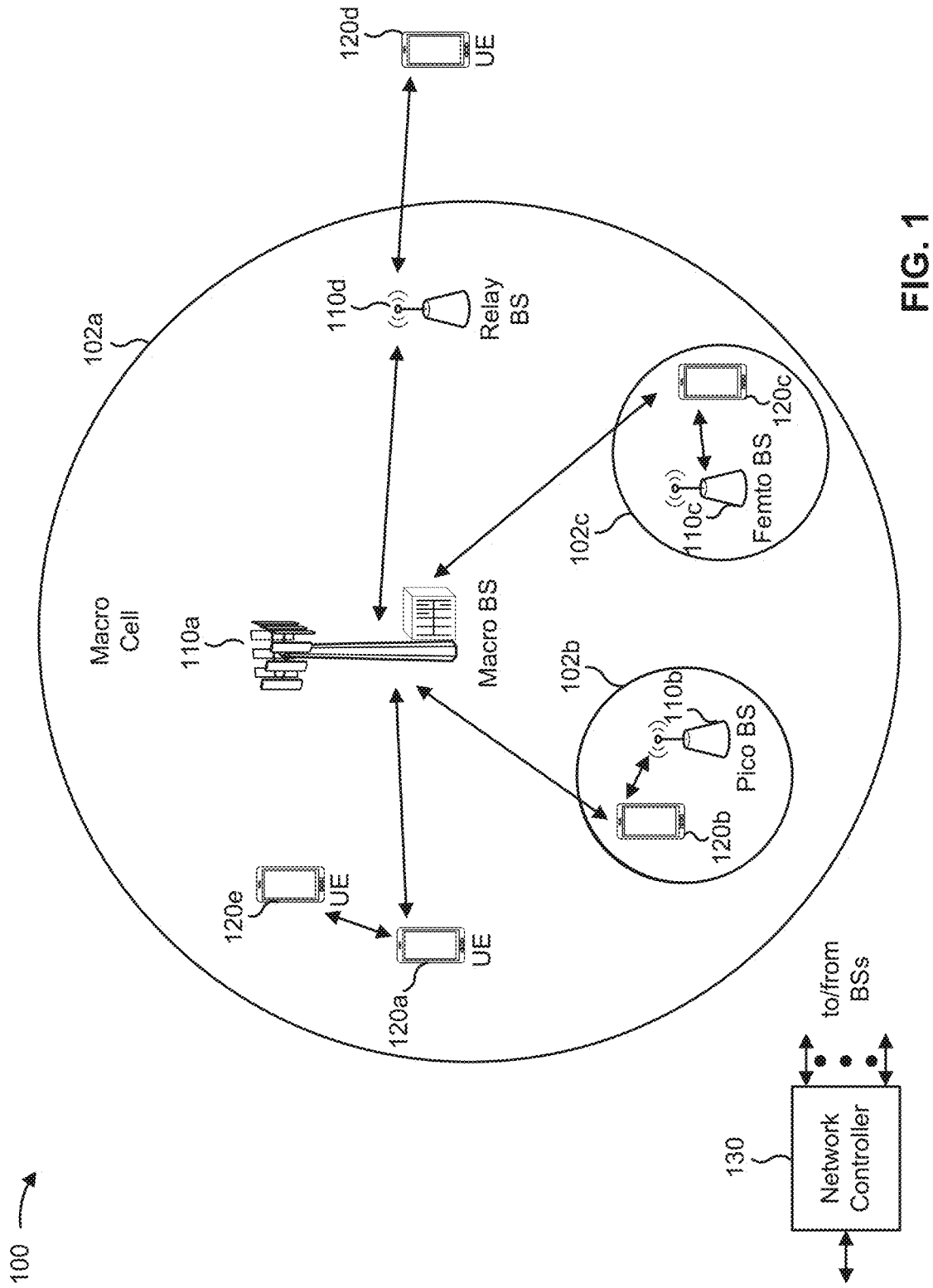
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a millimeter wave (mmW) relay 140 may receive an analog mmW signal from a base station 110, may amplify the analog mmW signal, and may transmit the amplified mmW signal to one or more UEs 120 (e.g., shown as UE 120f). Additionally, or alternatively, the mmW relay 140 may receive an analog mmW signal from a UE 120 (e.g., UE 120f), may amplify the analog mmW signal, and may transmit the amplified mmW signal to one or more base stations 110. In some aspects, the mmW relay 140 may support cooperative transmissions (e.g., coordinated multipoint (CoMP) transmissions), whereby the base station 110 and the mmW relay 140 concurrently or jointly transmit the analog mmW signal to UE 120f, or vice versa. In some aspects, the mmW relay 140 may be configured as a UE, an analog mmW repeater, sometimes also referred to as a layer 1 mmW repeater, a digital repeater, a relay node, a customer premises equipment (CPE), a wireless transmit receive point (TRP) acting as a distributed unit (e.g., of a 5G access node) that communicates wirelessly with a base station 110 acting as a central unit or an access node controller (e.g., of the 5G access node), and/or the like. The mmW relay 140 may receive the analog mmW signal from a transmitter node (e.g., a base station 110, a UE 120, and/or the like), amplify the analog mmW signal, and forward the amplified analog mmW signal to a receiver node (e.g., a UE 120, a base station 110, and/or the like) without performing analog-to-digital conversion of the analog mmW signal and/or otherwise performing any digital signal processing on the mmW signal. In this way, latency is reduced and a cost to produce and operate the mmW relay 140 is reduced.

As indicated above, FIG. 1 is provided as an example. Other examples may differ from what is described with regard to FIG. 1.

Figure 2:
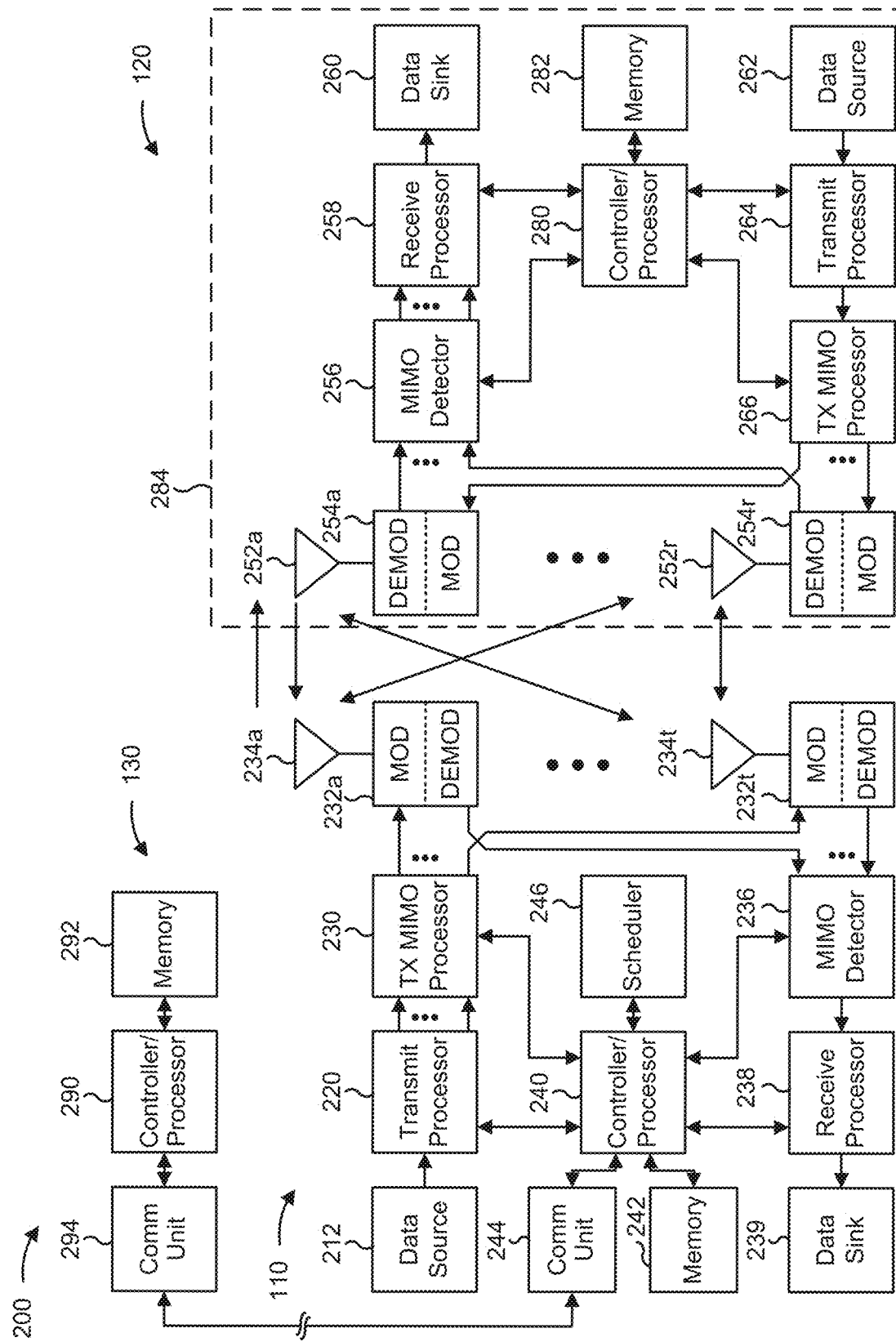
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5A-5D, FIG. 6, FIG. 7, FIG. 8, and/or FIG. 9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5A-5D, FIG. 6, FIG. 7, FIG. 8, and/or FIG. 9.

Controller/processor 240 of base station 110, controller/processor 280 of UE 120, and/or any other component(s) of FIG. 2 may perform one or more techniques associated with beam training in mmW relays including amplify-and-forward transmissions, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, interpreting the instructions, and/or the like.

In some aspects, UE 120 may include means for transmitting, to base station 110, feedback related to one or more beam training procedures, wherein the feedback includes a first complex channel estimate associated with a first beam pair providing a viable path for a first link between UE 120 and base station 110 (e.g., using controller/processor 280, transmit processor 264, TX MIMO processor 266, MOD 254, antenna 252, and/or the like), means for configuring, based at least in part on the one or more beam training procedures, a second transmit beam associated with a second beam pair to be used on a second link between UE 120 and a relay node that further communicates with base station 110 on a third link (e.g., using controller/processor 280 and/or the like), means for transmitting a signal to base station 110 using a first transmit beam associated with a first beam pair and to a relay node using the second transmit beam associated with a second beam pair (e.g., using controller/processor 280, transmit processor 264, TX MIMO processor 266, MOD 254, antenna 252, and/or the like), and/or the like.

Additionally, or alternatively, in some aspects, UE 120 may include means for transmitting, to base station 110, feedback related to one or more beam training procedures (e.g., using controller/processor 280, transmit processor 264, TX MIMO processor 266, MOD 254, antenna 252, and/or the like), means for receiving a signal from a transmitter node using a receive beam associated with a first beam pair (e.g., using antenna 252, DEMOD 254, MIMO detector 256, receive processor 258, controller/processor 280, memory 282, and/or the like), means for transmitting an estimate of the signal to base station 110 using a transmit beam associated with a second beam pair (e.g., using controller/processor 280, transmit processor 264, TX MIMO processor 266, MOD 254, antenna 252, and/or the like), and/or the like.

In some aspects, base station 110 may include means for receiving feedback related to one or more beam training procedures (e.g., using antenna 234, DEMOD 232, MIMO detector 236, receive processor 238, controller/processor 240, and/or the like), means for receiving a signal from a transmitter node and an estimate of the signal from a relay node using a receive beam configured based at least in part on a first complex channel estimate, a second complex channel estimate, and a third complex channel estimate included in the feedback (e.g., using antenna 234, DEMOD 232, MIMO detector 236, receive processor 238, controller/processor 240, and/or the like), and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
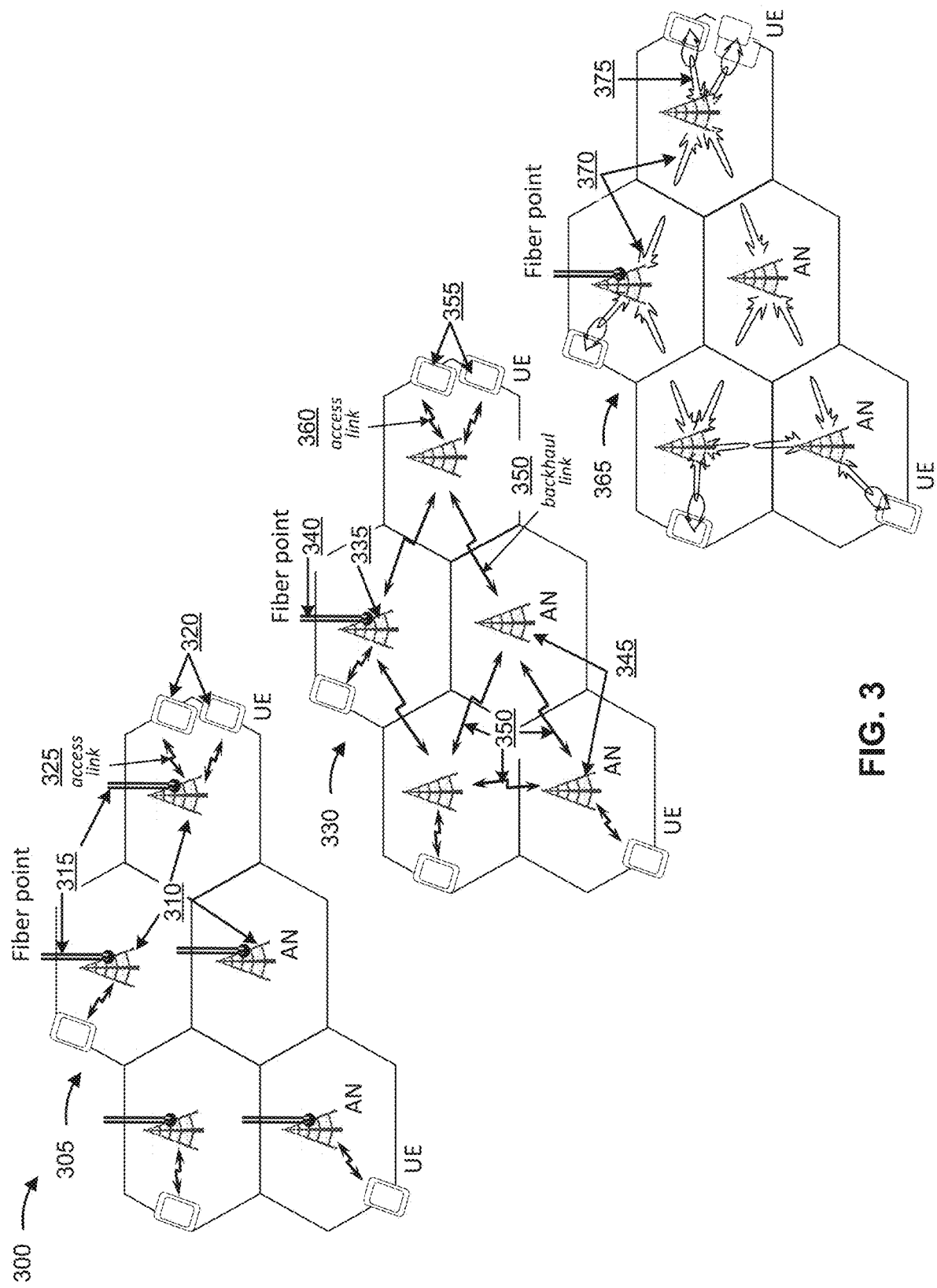
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize mmW technology and/or directional communications (e.g., beamforming, precoding, and/or the like) for communications among base stations and/or UEs (e.g., between two base stations, between two UEs, and/or between a base station and a UE). For example, wireless backhaul links 370 between base stations may use mmW signals to carry information and/or may be directed toward a target base station using beamforming, precoding, and/or the like. Similarly, the wireless access links 375 between a UE and a base station may use mmW signals and/or may be directed toward a target wireless node (e.g., a UE and/or a base station). Similarly, two or more UEs may communicate on a sidelink using mmW technology and/or beamforming to direct or otherwise steer one or more transmissions toward a target UE and/or to receive transmissions from a particular direction by using different weighting patterns to amplify a signal received at different antennas. In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
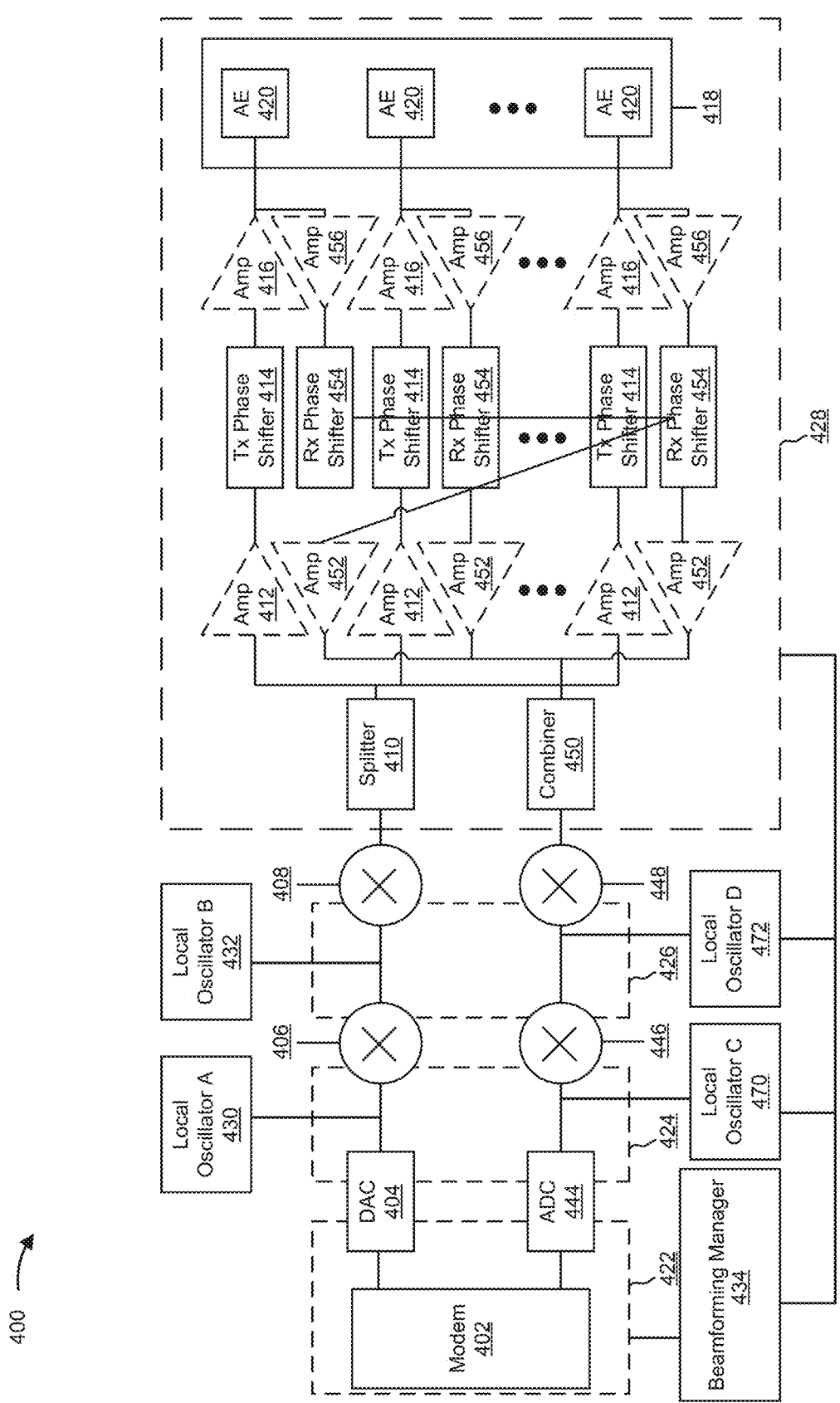
FIG. 4 is a diagram illustrating an example beamforming architecture that supports beamforming for millimeter wave (mmW) communications, in accordance with various aspects of the present disclosure.

FIG. 4 is a diagram illustrating an example architecture 400 that supports beamforming for millimeter wave (mmW) communications, in accordance with various aspects of the present disclosure. In some aspects, architecture 400 may implement aspects of wireless network 100. In some aspects, architecture 400 may be implemented in a transmitting device (e.g., a first wireless communication device, UE, or base station) and/or a receiving device (e.g., a second wireless communication device, UE, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420.

Transmission lines or other waveguides, wires, traces, and/or the like are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a beamforming manager 434.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the beamforming manager 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 414 are present. In some aspects, neither the first amplifier 412 nor the second amplifier 414 is present. In some aspects, one of the two amplifiers 412, 414 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the beamforming manager 434) to provide independent control of the gain for each antenna element 420. For example, the modem 402 and/or the beamforming manager 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the beamforming manager 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the beamforming manager 434 may have at least one control line connected to each of the phase shifters 454 and which may be used to configure the phase sifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain.

When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, such as decoding, de-interleaving, and/or the like.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the beamforming manager 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The beamforming manager 434 may be located partially or fully within one or more other components of the architecture 400. For example, the beamforming manager 434 may be located within the modem 402 in some aspects.

As indicated above, FIG. 4 is provided as an example. Other examples may differ from what is described with regard to FIG. 4.

Wireless communication devices (e.g., UEs, BSs, CPEs, and/or the like) may use beamforming to improve radio performance, increase throughput and reliability, and/or the like. This may be particularly useful in mmW communication systems, in which high operating frequencies can lead to significant path loss. For example, because mmW communications have a higher frequency and a shorter wavelength than various other types of radio waves used for communications (e. g., sub-6 GHz communications), mmW communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station that communicates using the sub-6 GHz radio waves. However, a millimeter wave may be incapable of penetrating the same wall (e.g., depending on a thickness of the wall, a material from which the wall is constructed, and/or the like).

Accordingly, to improve radio performance, mitigate path loss, and/or the like, mmW communications may be performed using beamforming, in which a transmitting wireless communication device may generate a transmit beam, and a receiving wireless communication device may generate a corresponding receive beam. The transmit beam may be reflected, diffracted, scattered, and/or the like by one or more clusters, obstacles, materials, and/or the like within an environment between or around the transmitting and receiving devices. As used herein, the term "cluster" and/or the like may refer to an object in the channel environment through which energy propagates. Example clusters in mmW channel environments may include, among other things, reflectors such as lamp posts, vehicles, glass/window panes, metallic objects, and/or the like, diffractors such as edges or corners of buildings, walls, and/or the like, and/or scattering via irregular objects such as walls, human bodies, and/or the like.

Furthermore, in addition to beamforming, coordinated transmission (or coordinated multi-point (CoMP) transmission) is another technique that may be used to improve radio performance, mitigate path loss, offer diversity in terms of TRPs, and/or the like in mmW communications. For example, in some aspects, a coordinated transmission system may include one base station cooperating with another base station to transmit to one or more UEs across multiple TRPs. However, while coordinated transmission to a UE across multiple TRPs may improve performance on a downlink, in some cases, a UE may lack a clear line-of-sight (LOS) path to a base station or TRP on an uplink.

Some aspects described herein provide techniques and apparatuses to enable cooperative transmissions in which a UE and one or more relay nodes collaborate to jointly transmit one or more signals to a base station, a TRP, and/or the like. For example, in some aspects, the UE may transmit a signal to one or more relay nodes on a relay link (e.g., a sidelink and/or the like) via a first set of one or more transmit beams, and the one or more relay nodes may receive the signal via one or more corresponding receive beams. Furthermore, the UE may transmit the signal to a base station on a direct access link via a second set of one or more transmit beams, and the one or more relay nodes may concurrently transmit an estimate of the signal to the base station on an indirect access link via a third set of one or more transmit beams. In some aspects, the UE and the one or more relay nodes may perform one or more beam training procedures to determine the transmit and receive beams to be used on the relay link, the direct access link, and the indirect access link. Furthermore, the UE and the one or more relay nodes may provide feedback related to the one or more beam training procedures to the base station, which may use the feedback to configure a receive beam to concurrently receive the signal from the UE via the direct access link and the estimate of the signal from the one or more relay nodes via the indirect access link.

For example, as described herein, the feedback related to the one or more beam training procedures may include indices in a beamforming codebook that includes multiple beamforming configurations to identify a best beam pair (e.g., a transmit beam and a corresponding receive beam that provide a dominant or otherwise viable path) for the direct access link and one or more measurements related to the best beam pair (e.g., a reference signal received power (RSRP), a signal quality, a signal strength, and/or the like). In some aspects, a beam pair that corresponds to the establishment of a link with a viable path and the associated RSRP, signal quality, signal strength, and/or the like can also be provided in the feedback. Furthermore, in some aspects, the feedback may include one or more complex channel estimates that are based at least in part on one or more parameters, such as transmit power budgets for the best beam pairs to be used on the relay, direct, and/or indirect links, post-beamformed signal estimates and beamforming gains provided by the best beam pairs to be used on the relay, direct, and/or indirect links, and/or the like. Accordingly, in some aspects, the base station may use the feedback related to the one or more beam training procedures to configure a receive beam that maximizes a signal to noise ratio (SNR) for the signal and the estimate of the signal that may be concurrently received on the direct link and the indirect access link. In this way, coordinated transmission to a base station from a UE and one or more relay nodes may be performed to improve performance, reliability, robustness, and/or the like on an access link in cases where one or more obstructions, reflectors, and/or other environmental variables affect a propagation path from the UE to the base station.

Figure 5A:
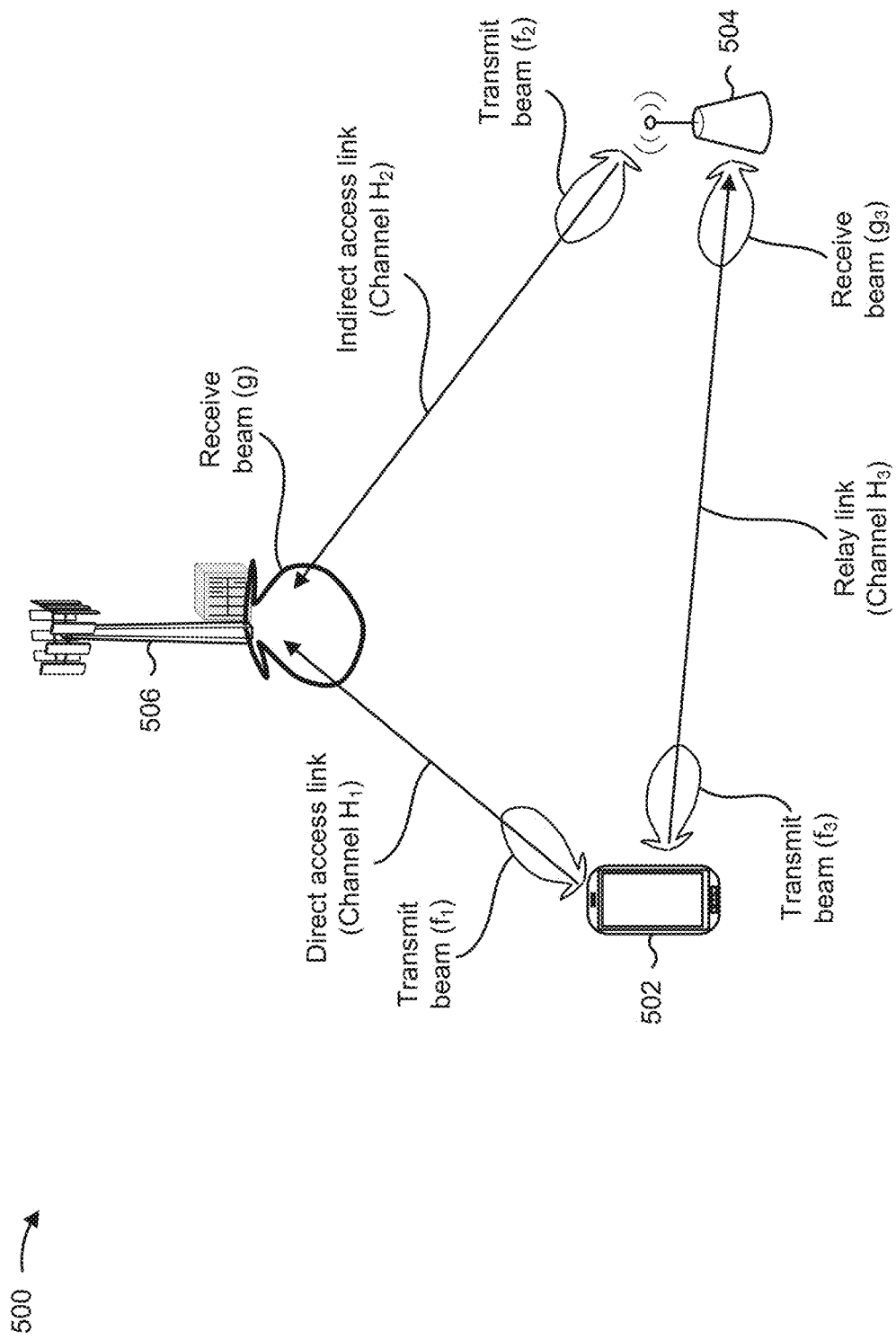
FIGS. 5A-5D are diagrams illustrating an example of beam training in millimeter wave relays using amplify-and-forward transmissions, in accordance with various aspects of the present disclosure.

FIGS. 5A-5D are diagrams illustrating an example 500 of beam training in mmW relays using amplify-and-forward transmissions, in accordance with various aspects of the present disclosure. As shown in FIG. 5A, example 500 may include beamformed communication between various devices in a wireless network, such as a UE 502, a relay node 504 (e.g., another UE, an analog and/or digital repeater, a customer premises equipment (CPE), a fixed wireless access device, and/or the like), and a base station 506 (e.g., a gNB, a TRP, and/or the like). For example, the UE 502 and the relay node 504 may be distributed at different locations and various transmit beams and various receive beams may be used to enable cooperative transmission from the UE 502 and the relay node 504 to the base station 506.

In particular, as shown in FIG. 5A, the UE 502 may be configured to transmit one or more signals to the base station 506 on a direct access link (Channel $H_1$) using a first transmit beam ($f_1$), and the relay node 504 may be configured to transmit one or more signals to the base station 506 on an indirect access link (Channel $H_2$) using a second transmit beam ($f_2$). Furthermore, as shown in FIG. 5A, the UE 502 and the relay node 504 may be configured to communicate over a relay link (Channel $H_3$), such as a sidelink and/or the like. For example, the UE 502 may transmit, to the relay node 504, one or more signals to be relayed to the base station 506 using a third transmit beam ($f_3$), and the relay node 504 may receive the one or more signals using a corresponding relay receive beam ($g_3$). In some aspects, the relay node 504 may estimate the one or more signals received from the UE 502 and relay the estimates of the one or more signals to the base station 506 using an amplify-and-forward technique. For example, in the amplify-and-forward technique, the relay node 504 may generally amplify a received signal and forward the amplified signal to a receiver node (e.g., the base station 506) without performing any digital signal processing (e.g., decoding, quantizing, re-encoding, and/or the like) on the signal. In this way, the amplify-and-forward technique reduces latency, power, temperature given the higher processing power incurred, complexity, and/or the like that would otherwise be introduced if the relay node 504 were to perform digital signal processing on the signal prior to relaying the signal, conserves computing resources that would otherwise be wasted performing the digital signal processing, and/or the like.

In some aspects, as further shown in FIG. 5A, the base station 506 may configure a base station receive beam (g) to receive the signal from the UE 502 via the direct access link substantially concurrently with the estimate of the signal transmitted over the indirect access link by the relay node 504 using a single beam (e.g., the base station receive beam (g)). For example, when the UE 502 has a signal to be transmitted to the base station 506, the UE 502 may use the transmit beam $f_1$ to transmit the signal to the base station 506 over channel $H_1$, and the UE 502 may further use the transmit beam $f_3$ to transmit the signal to the relay node 504 over channel $H_3$. The relay node 504 may receive the signal using the receive beam $g_3$, estimate and amplify the signal, and transmit the estimated and amplified signal to the base station 506 via transmit beam $f_2$. Accordingly, in some aspects, the receive beam used at the base station 506 may be configured as a relatively wide beam to enable concurrent reception of the signal transmitted over channel $H_1$ and the estimated and amplified signal transmitted over channel $H_2$. For example, as described herein, the base station 506 may configure the receive beam to maximize a SNR associated with the combined signal received via channel $H_1$ and channel $H_2$ based at least in part on feedback related to one or more beam training procedures that are used to select or otherwise configure the beams $f_3$, and $g_3$ that the UE 502 and the relay node 504 use to cooperatively transmit to the base station (e.g., using beam $f_1$ via the direct access link over channel $H_1$ and beams $f_3$, $g_3$, and $f_2$ via the indirect link over channel $H_3$ and channel $H_2$).

In particular, when the UE 502 sends a signal s (e.g., a scalar information symbol from a Quadrature Amplitude Modulation (QAM) constellation) to the base station 506 via the direct access link and to the relay node 504 via the relay link, the relay node 504 may estimate the signal received from the UE 502 via the relay link as follows:

$$\hat{s}_1 = G_3^H \cdot (\sqrt{p_3} H_3 f_3 s + n_3) \quad \text{Equation 1}$$

where $\hat{s}_1$ is the estimated signal, $H_i$ is the channel over which the symbol is transmitted, $f_i$ is a beamforming vector used to transmit the symbol over channel $H_i$, $\rho_i$ is a power budget associated with the transmission over channel $H_i$, $g_3^H$ is a beamforming vector associated with the receive beam $g_3$, and $n_i$ is additive (e.g., white Gaussian) noise associated with the signal as-received over channel $H_i$. Accordingly, when the base station 506 receives the combined signal from the UE 502 via the direct access link and from the relay node 504 via the indirect access link, the combined signal ($\hat{s}$) may be represented as follows:

$$\hat{s} = g^H \cdot (\sqrt{\rho_1} H_1 f_1 s + \sqrt{\rho_2} H_2 f_2 \hat{s}_1 + n) \quad \text{Equation 2}$$

$$\hat{s} = g^H \cdot (\sqrt{\rho_1} H_1 f_1 s + \sqrt{\rho_2 \rho_3} H_2 f_2 \cdot g_3^H H_3 f_3 s + \sqrt{\rho_2} H_2 f_2 \cdot g_3^H n_3 + n) \quad \text{Equation 3}$$

where Equation 2 includes the term $\sqrt{\rho_1} H_1 f_1 s$ to represent the signal received from the UE 502 over the direct access link, the term $\sqrt{\rho_2} H_2 \hat{s}_1$ to represent the estimate of the signal received from the relay node 504 over the indirect access link, and the additional term n to represent additive (e.g., white Gaussian) noise associated with the combined signal. Accordingly, the representation of $\hat{s}_1$ provided in Equation 1 may be substituted into Equation 2, yielding the representation of the combined signal $\hat{s}$ in Equation 3.

In some aspects, based at least in part on the expressions provided in Equations 1-3, an average (over noise) received SNR ($SNR_{rx}$) at the base station 506 may be represented as follows:

$$SNR_{rx} = \frac{|\sqrt{\rho_1} \cdot g^H H_1 f_1 + \sqrt{\rho_2 \rho_3} \cdot g^H H_2 f_2 \cdot g_3^H H_3 f_3|^2}{1 + \rho_2 \cdot |g^H H_2 f_2|^2} \quad \text{Equation 4}$$

Furthermore, and based at least in part on the expressions provided in Equations 1-3, an optimal base station receive beam ($g_{opt}$) to be used by the base station 506 to simultaneously receive the symbol from the UE 502 and the estimate of the symbol from the relay node 504 may be represented as follows:

$$g_{opt} = \frac{c}{\|c\|} \text{ where } c = a - \frac{b^H a}{1 + b^H b} \cdot b \quad \text{Equation 5}$$

where $a = \sqrt{\rho_1} H_1 f_1 + \sqrt{\rho_2 \rho_3} g_3^H H_3 f_3 \cdot H_2 f_2$ and $b = \sqrt{\rho_2} H_2 f_2$.

Accordingly, in order to configure an optimal receive beam ($g_{opt}$) that maximizes the received SNR at the base station 506, the base station 506 may be provided with feedback that includes various complex channel estimates that correspond to or otherwise capture the respective power budgets, channel matrices, beamforming vectors, and/or the like shown in Equation 5. In particular, as described herein, the UE 502 and the relay node 504 may perform one or more beam training procedures to select or otherwise configure the best beam pairs (or other beam pairs) for the direct access link, the indirect access link, and the relay link, and the UE 502 and the relay node 504 may then provide feedback to the base station 506 that includes various complex channel estimates enabling the base station to configure the optimal receive beam $g_{opt}$.

Figure 5B:
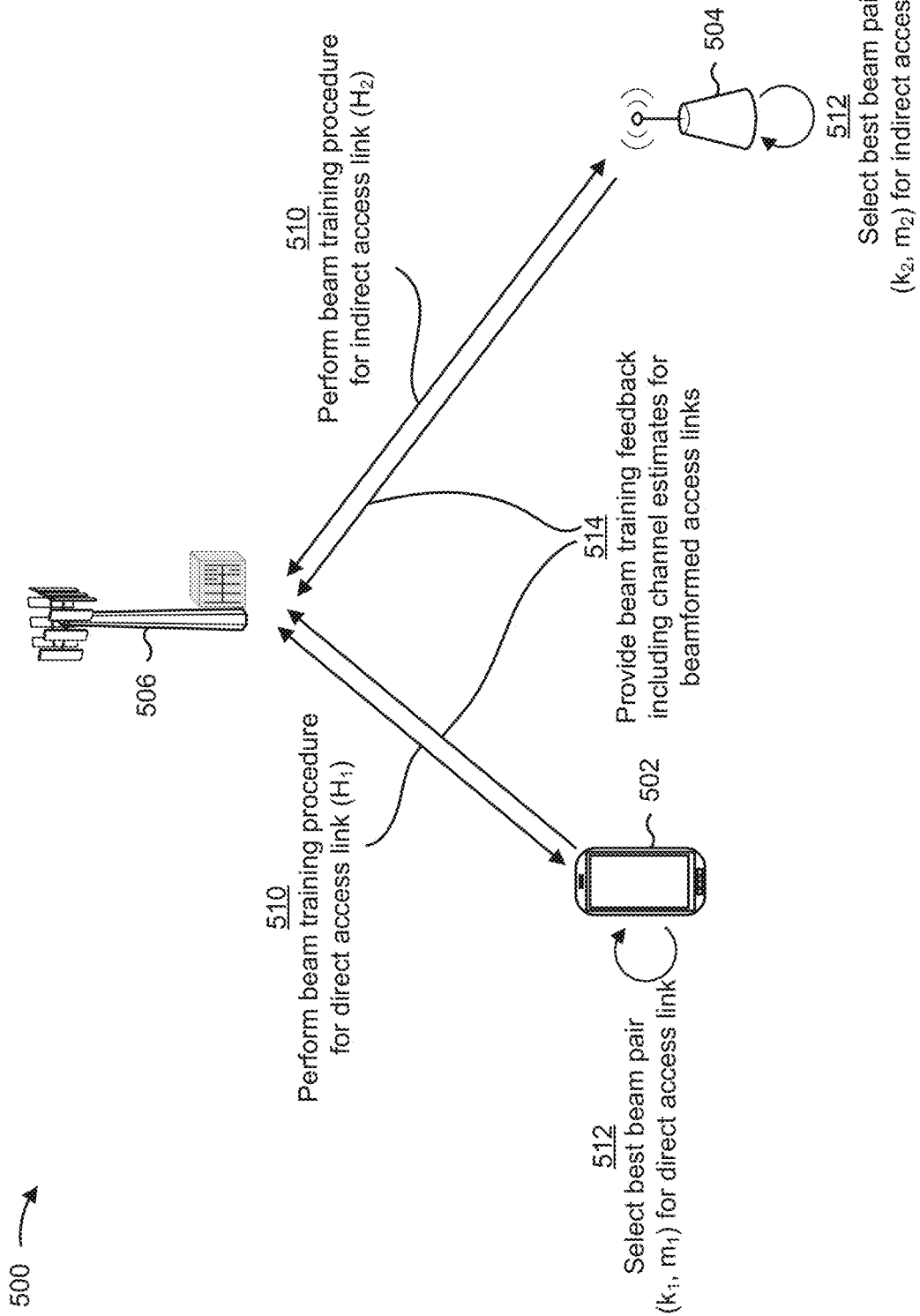

In particular, as shown in FIG. 5B, and by reference number 510, the base station 506 may beam train the UE 502 and the relay node 504 to determine a best beam pair for the direct access link and a best beam pair for the indirect access link. For example, in some aspects, the base station 506 may beam train the UE 502 and the relay node 504 using a beam codebook that includes multiple beam configurations associated with different directionalities, paths, precodings, beam weights, and/or the like, and each beam configuration in the codebook may be associated with a particular index. When performing the beam training procedure, the base station 506 may communicate with the UE 502 and the relay node 504 using multiple beams (e.g., N narrow beams that scan a particular sector, such as a 120-degree sector in azimuth and a 30-degree sector in elevation), and the UE 502 and the relay node 504 may similarly use multiple beams to obtain one or more measurements related to the multiple beams used by the base station 506.

As further shown in FIG. 5B, and by reference number 512, the UE 502 and the relay node 504 may each determine, based at least in part on the one or more measurements, a best beam pair for the respective access link to the base station 506. For example, as shown in FIG. 5B, the UE 502 may select a best beam pair ($k_1$, $m_1$) for the direct access link, where $k_1$ is a beamforming vector of beam weights that represents a direction for a best transmit beam for the direct access link and $m_1$ is a beamforming vector of beam weights that represents a direction for a best receive beam to be used by the base station 506 on the direct access link (assuming no cooperative transmission). Similarly, as shown in FIG. 5B, the relay node 504 may select a best beam pair ($k_2$, $m_2$) for the indirect access link, where $k_2$ is a beamforming vector of beam weights that represents a direction for a best transmit beam for the indirect access link and $m_2$ is a beamforming vector of beam weights that represents a direction for a best receive beam to be used by the base station 506 on the indirect access link (also assuming no cooperative transmission). For example, in some aspects, the best beam pairs may correspond to transmit beams and corresponding receive beams associated with a highest power (e.g., RSRP and/or the like), a highest signal quality, a highest signal strength, a highest signal strength with a constraint on interference such as a signal to interference plus noise ratio (SINR), and/or the like. Accordingly, the best beam pair may generally correspond to a viable path (e.g., a dominant path or dominant cluster) in the corresponding channel, which may correspond to a path that includes a reflector or other physical object that causes a transmission to be received at a relatively high power (for example, as compared to a path not including, for example, a reflector). Additionally, or alternatively, a beam pair that maximizes a given performance metric (e.g., RSRQ, SINR, signal to interference ratio (SIR), and/or the like) may be selected.

As further shown in FIG. 5B, and by reference number 514, the UE 502 and the relay node 504 may each provide, to the base station 506, feedback from the beam training procedure. For example, in some aspects, the feedback that the UE 502 provides to the base station 506 may include indices, RSRPs, and/or the like associated with the best beam pair that the UE 502 selected for the direct access link, and the feedback that the relay node 504 provides to the base station 506 may similarly include indices, RSRPs, and/or the like associated with the best beam pair that the relay node 504 selected for the indirect access link. Furthermore, in some aspects, as shown in FIG. 5B, the feedback provided to the base station 506 may include channel estimates (e.g., complex channel estimates) for the beamformed direct access link and the beamformed indirect access link. For example, in some aspects, the UE 502 may determine a rank-1 approximation of the channel $H_1$ corresponding to the direct access link, as follows:

$$H_1 \approx \alpha_1 m_1 k_1^H \qquad \text{Equation 6}$$

where $H_1$ is a channel matrix associated with the direct access link and $\alpha_1$ is a complex beamforming gain estimate over the viable path provided by transmit beam $k_1$ and receive beam $m_1$. Accordingly, in addition providing feedback indicating the beam index ($m_1$) to be used at the base station 506 for the direct access link, the RSRP for the $k_1$-$m_1$ beam pair, and/or the like, the beam training feedback that the UE 502 provides to the base station 506 may include a complex scalar estimate $c_1$ that captures $\sqrt{\rho_1}\alpha_1$, which enables the base station 506 to approximate the first term in the expression for a in Equation 5 based at least in part on an approximation whereby $\sqrt{\rho_1}H_1 f_1 \approx c_1 m_1$. Furthermore, the relay node 504 may provide similar beam training feedback to the base station. For example, in addition providing feedback indicating the beam index ($m_2$) to be used at the base station 506 for the indirect access link, the RSRP for the $k_2$-$m_2$ beam pair, and/or the like, the beam training feedback that the relay node 504 provides to the base station 506 may include a complex scalar estimate $c_2$ that captures $\sqrt{\rho_2}\alpha_2$, which enables the base station 506 to approximate the expression for b in Equation 5 and part of the second term in the expression for a in Equation 5 based at least in part on an approximation whereby $\sqrt{\rho_2}H_2 f_2 \approx c_2 m_2$.

Figure 5C:
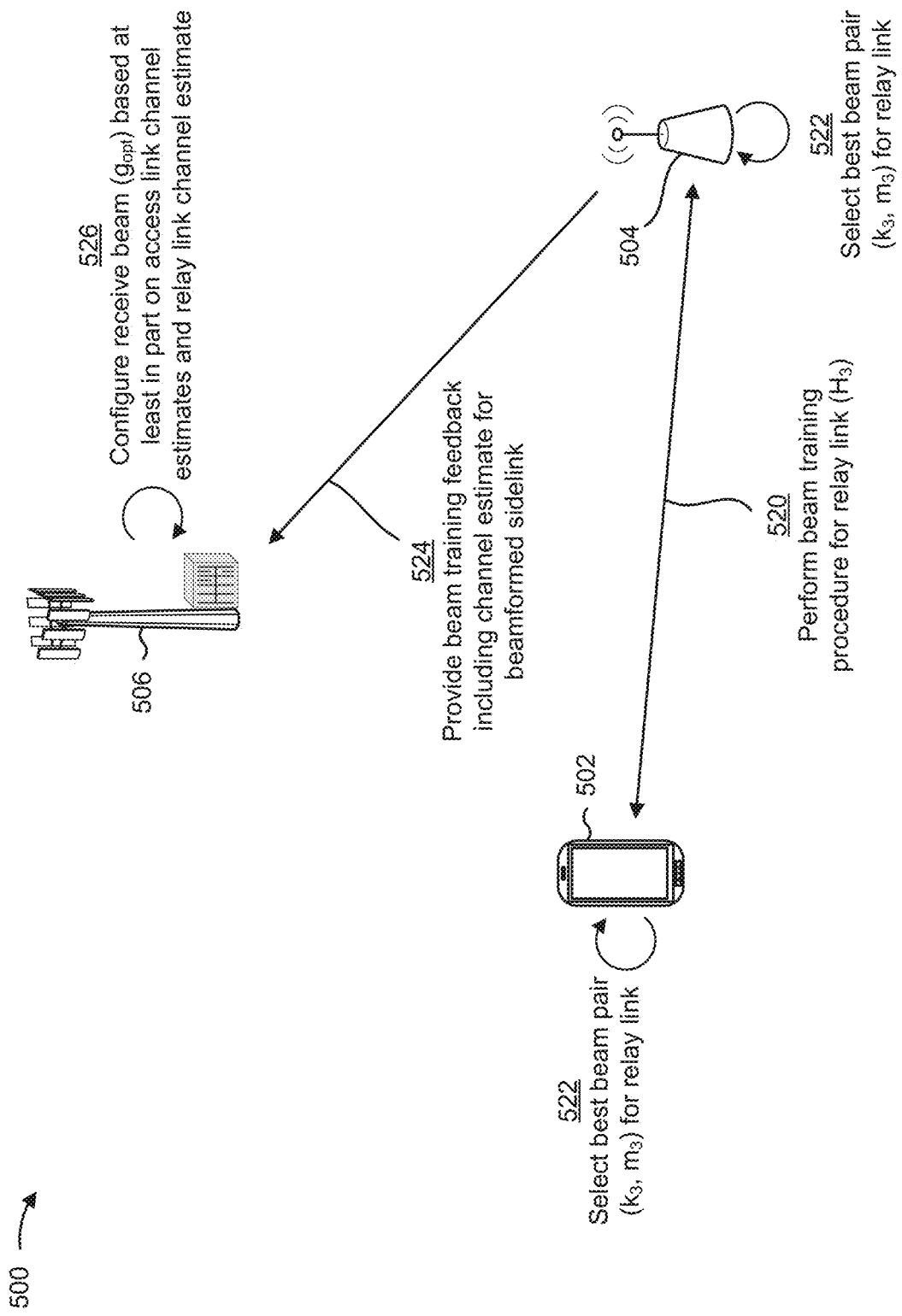

As shown in FIG. 5C, and by reference number 520, the UE 502 and the relay node 504 may perform an additional beam training procedure to determine a best beam pair for the relay link. For example, in some aspects, the UE 502 and the relay node 504 may use respective beam codebooks that includes multiple beam configurations associated with different directionalities, paths, precodings, beam weights, and/or the like, and each beam configuration in the codebook may be associated with a particular index. When performing this beam training procedure, the UE 502 may use multiple transmit beams in the codebook to communicate with the relay node 504, and the relay node 504 may similarly use multiple receive beams to gather energy from particular directions and obtain one or more measurements related to the multiple transmit beams.

As further shown in FIG. 5C, and by reference number 522, the UE 502 and the relay node 504 may each determine, based at least in part on the one or more measurements, a best beam pair for the relay link. For example, as shown in FIG. 5C, the UE 502 and the relay node 504 may select or otherwise coordinate a best beam pair ($k_3$, $m_3$) for the relay link, where $k_3$ is a beamforming vector of beam weights that represents a direction for a best transmit beam for the relay link and $m_3$ is a beamforming vector of beam weights that represents a direction for a best receive beam for the relay link.

As further shown in FIG. 5C, and by reference number 524, the relay node 504 may provide, to the base station 506, feedback on the beam training procedure performed for the relay link. For example, in some aspects, the feedback on the relay link beam training procedure may include a channel estimate (e.g., a complex channel estimate) for the beamformed relay link. For example, in some aspects, the feedback may include a complex scalar estimate $c_3$ that captures a beamforming gain over the relay link (channel $H_3$) with the UE 502 using transmit beam $k_3$ and the relay node 504 using relay receive beam $m_3$, which enables the base station 506 to approximate the rest of the second term in the expression for a in Equation 5 based at least in part on an approximation whereby $\sqrt{\rho_3}g_3^H H_3 f_3 \approx c_3$.

Accordingly, as further shown in FIG. 5C, and by reference number 526, the base station 506 may configure the optimal receive beam ($g_{opt}$) based at least in part on the channel estimates $c_1$, $c_2$ for the direct and indirect access links, the channel estimate $c_3$ for the relay link, and the indices $m_1$, $m_2$ that correspond to the best receive beams to be used by the base station 506 for the direct and indirect access links if there were no cooperative transmission by the UE 502 and the relay node 504. In particular, by substituting the various approximations given above into Equation 5, the optimal receive beam to simultaneously receive a cooperative transmission from the UE 502 via the direct access link and the relay node 504 via the indirect access link may be approximated as follows:

$$g_{opt} = \frac{c}{\|c\|} \text{ where} \qquad \text{Equation 7}$$
$$c = c_1 m_1 + c_2 c_3 m_2 - c_2 m_2 \cdot \frac{c_2^* c_1 \cdot m_2^H m_1 + |c_2|^2 c_3}{1 + |c_2|^2}$$

Figure 5D:
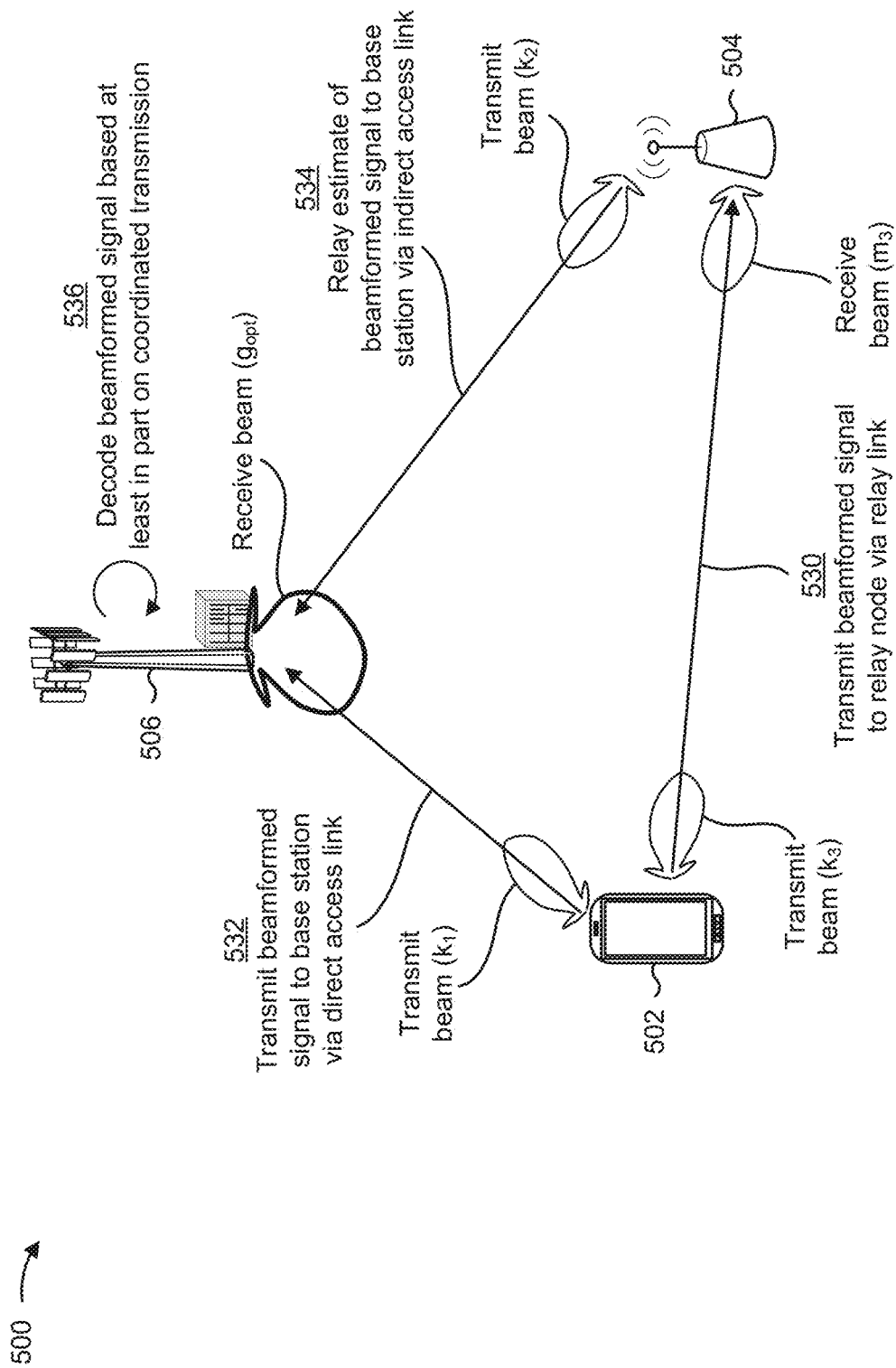

In some aspects, as shown in FIG. 5D, the UE 502 and the relay node 504 may cooperatively transmit one or more signals to the base station 506 based on the best transmit beams ($k_1$, $k_2$) that were selected during the beam training procedures for the direct and indirect access links, the best beam pair ($k_3$, $m_3$) that was selected during the beam training procedure for the relay link, and the optimal receive beam ($g_{opt}$) that the base station 110 configured based at least in part on the feedback on the beam training procedures for the direct access link, the indirect access link, and the relay link.

More particularly, as shown in FIG. 5D, and by reference number 530, the UE 502 may transmit a beamformed signal (e.g., a scalar symbol) to the relay node 504 via the relay link using the transmit beam $k_3$ that was selected during the beam training procedure for the relay link. Furthermore, as shown, the relay node 504 may receive the beamformed transmission via the relay link using the receive beam $m_3$ that was selected during the beam training procedure for the relay link.

As further shown in FIG. 5D, and by reference number 532, the UE 502 may further transmit the beamformed signal to the base station 506 via the direct access link using the transmit beam $k_1$ that was selected during the beam training procedure for the direct access link. Furthermore, as shown, the base station 506 may receive the beamformed transmission from the UE 502 via the direct access link using the optimal receive beam $g_{opt}$ that was configured based on the feedback related to the beam training procedures for the direct access link, the indirect access link, and the relay link. In some aspects, as described in further detail below, the UE 502 may transmit the beamformed signal to the relay node 504 and to the base station 506 in two separate symbols or slots. Additionally, or alternatively, the UE 502 may simultaneously transmit the beamformed signal to the relay node 504 and to the base station 506 in a single symbol or slot (e.g., where the UE 502 has capabilities to simultaneously transmit and receive, such as full-duplexing or approximate full-duplexing, where the UE 502 has a sufficient power budget that allows a maximum available transmit power to be split among different simultaneous transmissions without causing degraded performance, and/or the like).

As further shown in FIG. 5D, and by reference number 534, the relay node 504 may relay an estimate of the beamformed signal received from the UE 502 to the base station 506 via the indirect access link using the transmit beam $k_2$ that was selected during the beam training procedure for the direct access link. For example, the relay node 504 may estimate the beamformed signal as described in further detail above with reference to Equation 1. Furthermore, as shown, the base station 506 may receive the beamformed transmission from the relay node 504 via the indirect access link using the optimal receive beam $g_{opt}$ that was configured based on the feedback related to the beam training procedures for the direct access link, the indirect access link, and the relay link. In some aspects, as described in further detail below, the relay node 504 may transmit the estimate of the beamformed signal to the base station 506 substantially concurrently with the UE 502 transmitting the beamformed signal to the base station 506.

As further shown in FIG. 5D, and by reference number 536, the base station 506 may decode the beamformed signal based at least in part on the coordinated transmission from the UE 502 and the relay node 504. In this way, the base station 506 may receive the beamformed signal from multiple sources (e.g., the UE 502, the relay node 504, other relay nodes, and/or the like), which improves reliability, robustness, and/or the like for beamformed communications that may use mmW signals at high operating frequencies that could otherwise experience significant path loss.

As indicated above, FIGS. 5A-5D are provided as an example. Other examples may differ from what is described with respect to FIGS. 5A-5D. For example, while the example 500 illustrated in FIGS. 5A-5D and described in further detail above relates to coordinated transmissions in which the UE 502 and the relay node 504 concurrently transmit a signal and an estimate of the signal to the base station 506, in some aspects, the same or substantially similar techniques may be used to perform beam training to configure the optimal receive beam at the base station 506 where there are multiple relay nodes 504 cooperatively transmitting with the UE 502.

Figure 6:
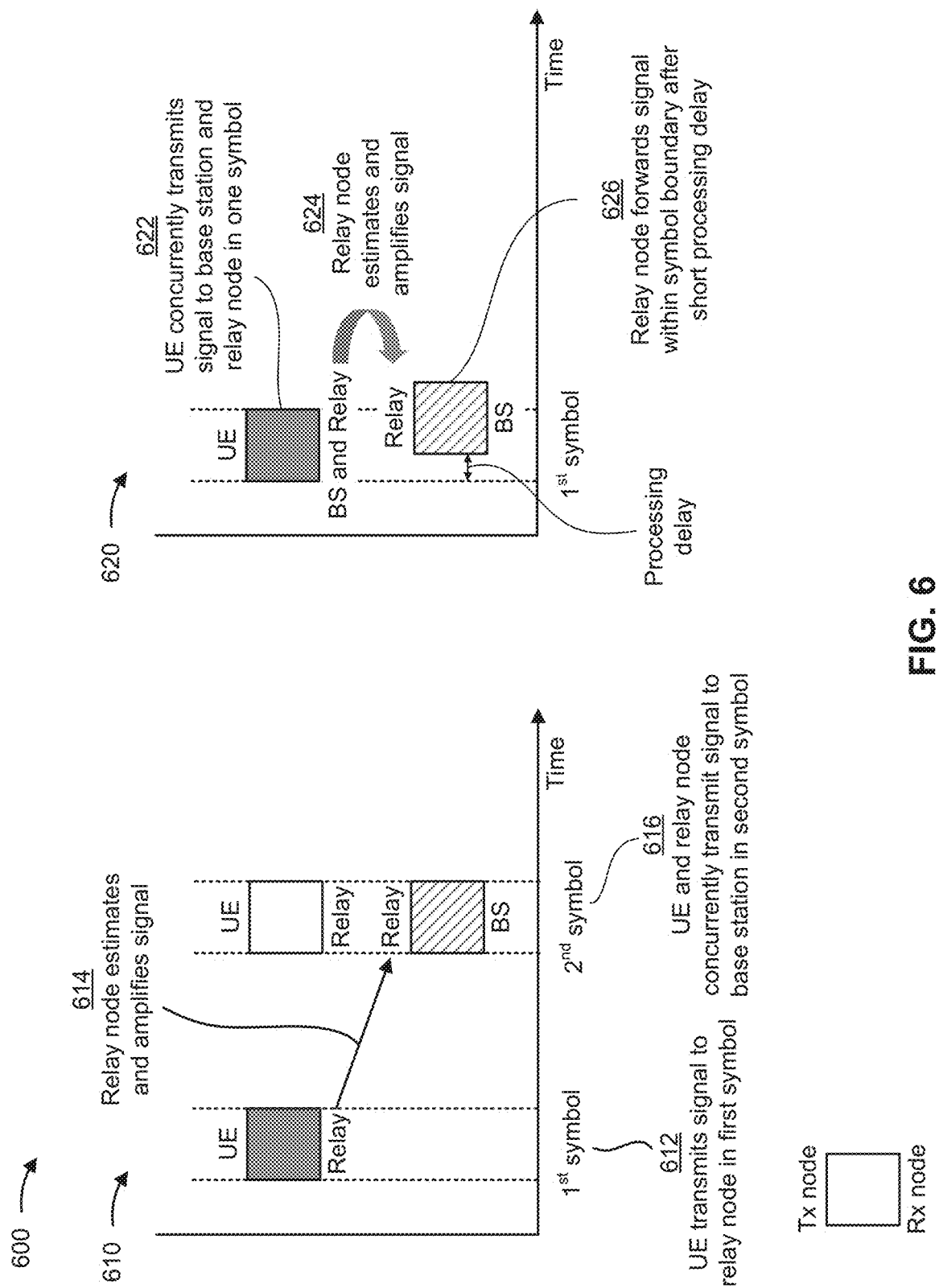
FIG. 6 is a diagram illustrating an example of relayed communications using amplify-and-forward transmissions, in accordance with various aspects of the present disclosure.

FIG. 6 is a diagram illustrating an example 600 of relay communications using amplify-and-forward transmissions, in accordance with various aspects of the present disclosure. In the example 600 illustrated in FIG. 6, a UE (e.g., UE 502 and/or the like) and a relay node (e.g., relay node 504) may cooperatively transmit to a base station (e.g., base station 506) using one or more beams that are selected or otherwise configured during and/or based at least in part on feedback related to one or more beam training procedures, as described above. Furthermore, as shown in FIG. 6, the UE and the relay node may cooperatively transmit to the base station according to a first timing 610 that is generally similar to a half-duplex transmission (e.g., where the UE can either transmit or receive in any particular symbol or slot) or according to a second timing 620 that is generally similar to a full-duplex transmission (e.g., where the relay node can simultaneously transmit and receive within a single symbol or slot). Accordingly, as described herein, the UE may transmit a signal (e.g., a scalar symbol and/or the like) to the base station during a signal transmission duration that at least partially overlaps in time with an estimate transmission duration during which the relay node transmits an estimate of the signal to the base station, as will be described further with reference to second timing 620.

For example, as shown by reference number 612, the UE may transmit a signal to a relay node on a relay link using a transmit beam that is steered or otherwise directed toward the relay node in a first symbol or slot, and the relay node may receive the signal using a receive beam that gathers energy from a direction associated with the transmit beam that is steered or otherwise directed toward the relay node. As further shown in FIG. 6, and by reference number 614, the relay node may estimate the signal received from the UE, and the estimated signal may be amplified for transmission to the base station. Accordingly, as further shown in FIG. 6, and by reference number 616, the UE and the relay node may concurrently transmit the signal and the estimated signal to the base station in a second symbol or slot. For example, in the second symbol or slot, the UE may transmit the signal to the base station on a direct access link using a transmit beam that is steered or otherwise directed toward the base station, and the base station may receive the signal using a receive beam that gathers energy from a direction associated with the transmit beam that is steered or otherwise directed toward the base station. In a similar manner, in the second symbol or slot, the relay node may transmit the estimated signal to the base station on an indirect access link using a transmit beam that is steered or otherwise directed toward the base station, and the base station may receive the signal using the receive beam, which may be configured as a relatively wide beam to simultaneously gather energy from transmit beam used by the UE and the transmit beam used by the relay node.

In this way, the UE does not have to split a maximum available transmit power among two or more simultaneous transmissions and can instead use up to the maximum available transmit power to transmit the signal to the relay node in the first symbol or slot and to the base station in the second symbol or slot.

Additionally, or alternatively, as shown by reference number 622, the UE may concurrently transmit the signal to the relay node on the relay link and to the base station on the direct access link in a single symbol or slot using two separate transmit beams that are respectively steered or otherwise directed toward the relay node and the base station. As further shown in FIG. 6, and by reference number 624, the relay node may estimate the signal received from the UE, and the estimated signal may be amplified for transmission to the base station. Accordingly, as further shown in FIG. 6, and by reference number 626, the relay node may forward the amplified estimate of the signal to the base station within a boundary of a symbol or slot in which the signal was received from the UE (subject to a short processing delay). Accordingly, in the second timing 620, a transmission from the UE to the base station and a transmission from the relay node to the base station may overlap within the boundary of the symbol or slot. The transmission from the UE to the base station may occur during a signal transmission duration, illustrated in this example as a first symbol. The transmission from the relay node to the base station may occur during an estimate transmission duration, illustrated in this example as being offset from a start of the first symbol by a processing delay. As shown in the second timing 620, the signal transmission duration at least partially overlaps in time with the estimate transmission duration.

In this way, the UE may share a maximum available transmit power among two or more simultaneous transmissions to the relay node and the base station, which may reduce latency because the transmission to the relay node and the cooperative transmissions to the base station all occur within a single symbol or slot. Furthermore, in the second timing, the relay node does not have to store the estimate of the symbol and/or any in-phase/quadrature (IQ) samples after the first symbol or slot for the relay transmission to be performed in the second symbol or slot. Furthermore, in some cases, the relay link (e.g., a sidelink) may consume less spectrum resources than the direct and/or indirect access links, whereby the second (e.g., full-duplex) timing 620 may improve system resource allocation relative to the first (e.g., half-duplex) timing 610.

As indicated above, FIG. 6 is provided as an example. Other examples may differ from what is described with respect to FIG. 6.

Figure 7:
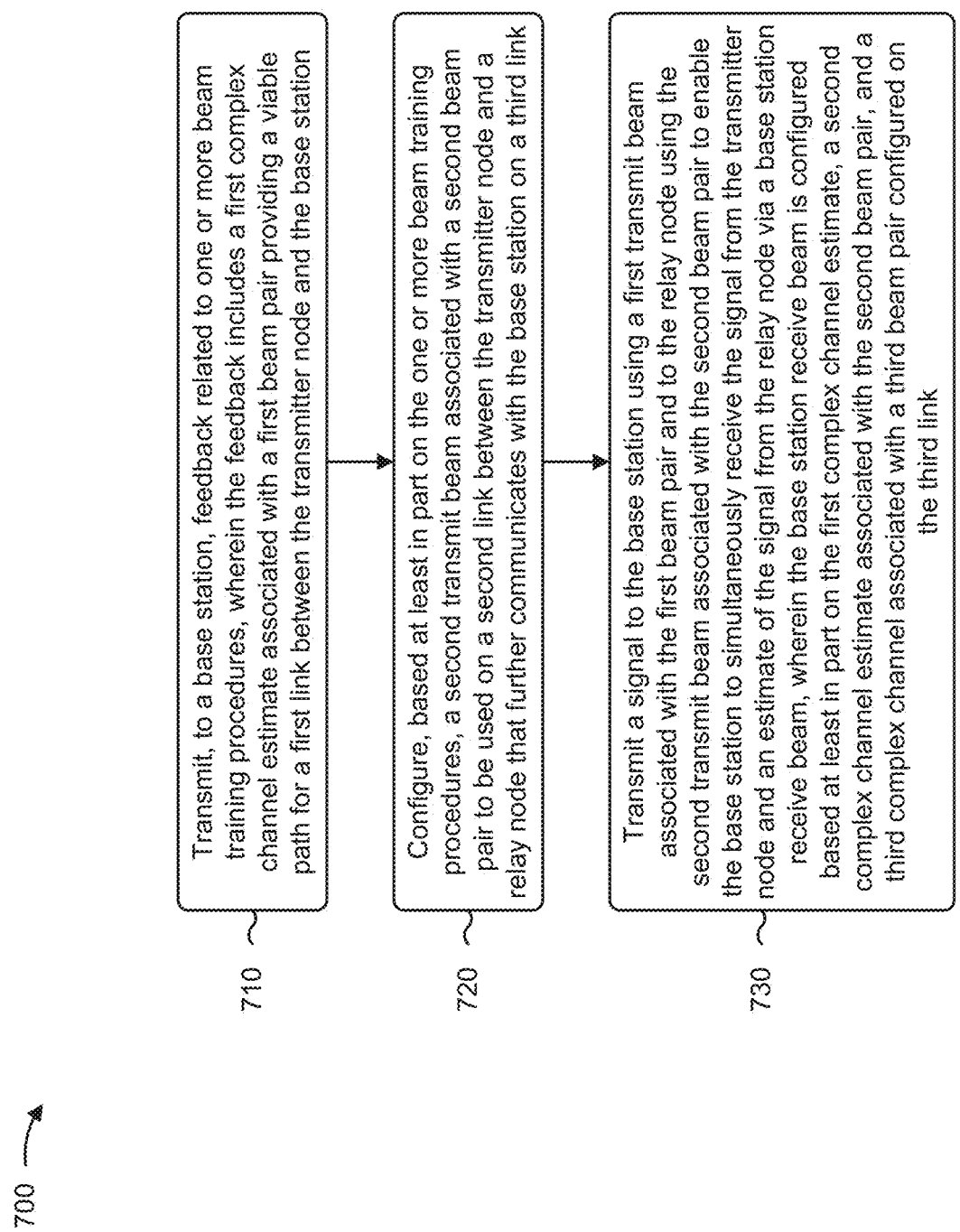
FIG. 7 is a diagram illustrating an example process performed, for example, by a transmitting node, in accordance with various aspects of the present disclosure.

FIG. 7 is a diagram illustrating an example process 700 performed, for example, by a transmitting node, in accordance with various aspects of the present disclosure. Example process 700 is an example where a transmitting node (e.g., UE 120, UE 320, UE 355, UE 502, and/or the like) performs operations that relate to beam training in mmW relays using amplify-and-forward transmissions.

As shown in FIG. 7, in some aspects, process 700 may include transmitting, to a base station, feedback related to one or more beam training procedures, wherein the feedback includes a first complex channel estimate associated with a first beam pair providing a viable path for a first link between the transmitter node and the base station (block 710). For example, the transmitting node may transmit (e.g., using controller/processor 280, transmit processor 264, TX MIMO processor 266, MOD 254, antenna 252, architecture 400, and/or the like), to a base station, feedback related to one or more beam training procedures, as described above, for example, with reference to FIGS. 5A, 5B, 5C, 5D, and/or 6. In some aspects, the feedback includes a first complex channel estimate associated with a first beam pair providing a viable path for a first link between the transmitter node and the base station.

As further shown in FIG. 7, in some aspects, process 700 may include configuring, based at least in part on the one or more beam training procedures, a second beam pair to be used on a second link between the transmitter node and a relay node that further communicates with the base station on a third link (block 720). For example, the transmitting node may configure (e.g., using controller/processor 280, memory 282, architecture 400, and/or the like), based at least in part on the one or more beam training procedures, a second beam pair to be used on a second link between the transmitter node and a relay node that further communicates with the base station on a third link, as described above, for example, with reference to FIGS. 5A, 5B, 5C, 5D, and/or 6.

As further shown in FIG. 7, in some aspects, process 700 may include transmitting a signal to the base station using a first transmit beam associated with the first beam pair and to the relay node using a second transmit beam associated with the second beam pair to enable the base station to simultaneously receive the signal from the transmitter node and an estimate of the signal from the relay node via a base station receive beam, wherein the base station receive beam is configured based at least in part on the first complex channel estimate, a second complex channel estimate associated with the second beam pair, and a third complex channel associated with a third beam pair configured on the third link (block 730). For example, the transmitting node may transmit (e.g., using controller/processor 280, transmit processor 264, TX MIMO processor 266, MOD 254, antenna 252, architecture 400, and/or the like) a signal to the base station using a first transmit beam associated with the first beam pair and to the relay node using a second transmit beam associated with the second beam pair to enable the base station to simultaneously receive the signal from the transmitter node and an estimate of the signal from the relay node via a base station receive beam, as described above, for example, with reference to base station receive beams g, $g_{opt}$, and/or the like in FIGS. 5A, 5B, 5C, 5D, and/or 6. In some aspects, the base station receive beam is configured based at least in part on the first complex channel estimate, a second complex channel estimate associated with the second beam pair, and a third complex channel associated with a third beam pair configured on the third link.

Process 700 may include additional aspects, such as any single aspect or any combination of aspects described below and/or in connection with one or more other processes described elsewhere herein.

In a first aspect, the first complex channel estimate relates to a power budget and a beamforming gain associated with the first beam pair.

In a second aspect, alone or in combination with the first aspect, the feedback related to the one or more beam training procedures further includes a reference signal received power and one or more beam indices associated with the first beam pair.

In a third aspect, alone or in combination with one or more of the first and second aspects, the one or more beam training procedures include a first beam training procedure to select the first beam pair providing the viable path for the first link between the transmitter node and the base station and a second beam training procedure to select the second beam pair to be used on the second link between the transmitter node and the relay node.

In a fourth aspect, alone or in combination with one or more of the first through third aspects, transmitting the signal to the base station comprises transmitting the signal during a signal transmission duration that at least partially overlaps in time with an estimate transmission duration during which the relay node transmits the estimate of the signal to the base station.

In a fifth aspect, alone or in combination with one or more of the first through fourth aspects, the transmitter node transmits the signal to the relay node in a first slot, and the transmitter node transmits the signal to the base station in a second slot concurrently with the relay node transmitting the estimate of the signal to the base station.

In a sixth aspect, alone or in combination with one or more of the first through fifth aspects, the transmitter node transmits the signal to the relay node in the first slot using up to a maximum available power budget for the transmitter node, and the transmitter node transmits the signal to the base station in the second slot using up to the maximum available power budget for the transmitter node.

In a seventh aspect, alone or in combination with one or more of the first through sixth aspects, the transmitter node concurrently transmits the signal to the base station and the relay node in a single slot.

In an eighth aspect, alone or in combination with one or more of the first through seventh aspects, a maximum available power budget for the transmitter node is split among the first transmit beam and the second transmit beam when the signal is concurrently transmitted to the base station and the relay node in the single slot.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
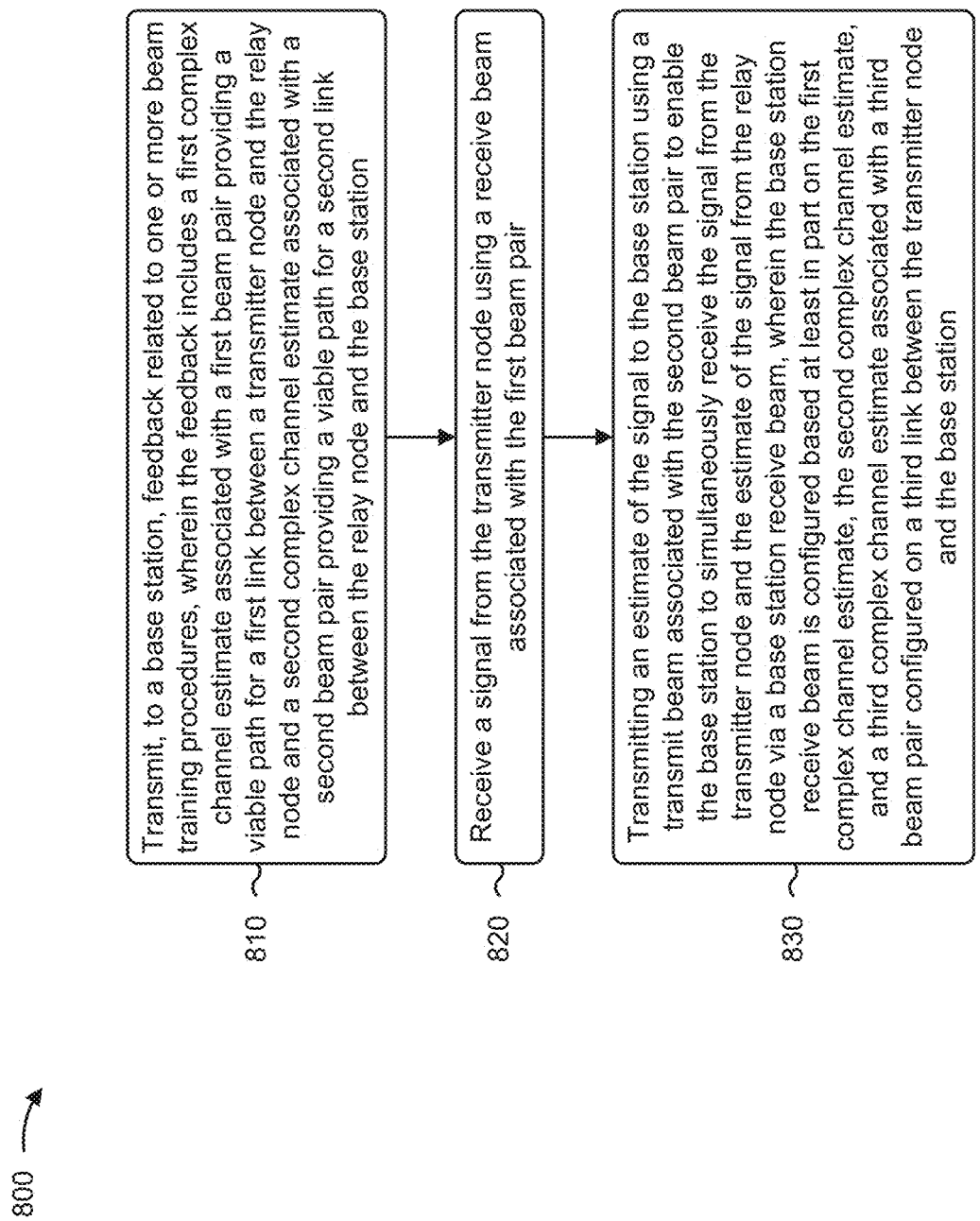
FIG. 8 is a diagram illustrating an example process performed, for example, by a relay node, in accordance with various aspects of the present disclosure.

FIG. 8 is a diagram illustrating an example process 800 performed, for example, by a relay node, in accordance with various aspects of the present disclosure. Example process 800 is an example where a relay node (e.g., UE 120, UE 320, UE 355, relay node 504, and/or the like) performs operations that relate to beam training in mmW relays using amplify-and-forward transmissions.

As shown in FIG. 8, in some aspects, process 800 may include transmitting, to a base station, feedback related to one or more beam training procedures, wherein the feedback includes a first complex channel estimate associated with a first beam pair providing a viable path for a first link between a transmitter node and the relay node and a second complex channel estimate associated with a second beam pair providing a viable path for a second link between the relay node and the base station (block 810). For example, the relay node may transmit (e.g., using controller/processor 280, transmit processor 264, TX MIMO processor 266, MOD 254, antenna 252, architecture 400, and/or the like), to a base station, feedback related to one or more beam training procedures, as described above, for example, with reference to FIGS. 5A, 5B, 5C, 5D, and/or 6. In some aspects, the feedback includes a first complex channel estimate associated with a first beam pair providing a viable path for a first link between a transmitter node and the relay node and a second complex channel estimate associated with a second beam pair providing a viable path for a second link between the relay node and the base station.

As further shown in FIG. 8, in some aspects, process 800 may include receiving a signal from the transmitter node using a receive beam associated with the first beam pair (block 820). For example, the relay node may receive (e.g., using antenna 252, DEMOD 254, MIMO detector 256, receive processor 258, controller/processor 280, memory 282, architecture 400, and/or the like) a signal from the transmitter node using a receive beam associated with the first beam pair, as described above, for example, with reference to relay receive beams $g_3$, $m_3$, and/or the like in FIGS. 5A, 5B, 5C, 5D, and/or 6.

As further shown in FIG. 8, in some aspects, process 800 may include transmitting an estimate of the signal to the base station using a transmit beam associated with the second beam pair to enable the base station to simultaneously receive the signal from the transmitter node and the estimate of the signal from the relay node via a base station receive beam, wherein the base station receive beam is configured based at least in part on the first complex channel estimate, the second complex channel estimate, and a third complex channel estimate associated with a third beam pair configured on a third link between the transmitter node and the base station (block 830). For example, the relay node may transmit (e.g., using controller/processor 280, transmit processor 264, TX MIMO processor 266, MOD 254, antenna 252, architecture 400, and/or the like) an estimate of the signal to the base station using a transmit beam associated with the second beam pair to enable the base station to simultaneously receive the signal from the transmitter node and the estimate of the signal from the relay node via a base station receive beam, as described above, for example, with reference to base station receive beams $g$, $g_{opt}$, and/or the like in FIGS. 5A, 5B, 5C, 5D, and/or 6. In some aspects, the base station receive beam is configured based at least in part on the first complex channel estimate, the second complex channel estimate, and a third complex channel estimate associated with a third beam pair configured on a third link between the transmitter node and the base station.

Process 800 may include additional aspects, such as any single aspect or any combination of aspects described below and/or in connection with one or more other processes described elsewhere herein.

In a first aspect, the first complex channel estimate relates to a first power budget and a first beamforming gain associated with the first beam pair, and the second complex channel estimate relates to a second power budget and a second beamforming gain associated with the second beam pair.

In a second aspect, alone or in combination with the first aspect, the feedback related to the one or more beam training procedures further includes a reference signal received power and one or more beam indices associated with the second beam pair.

In a third aspect, alone or in combination with one or more of the first and second aspects, the one or more beam training procedures include a first beam training procedure to select the first beam pair providing the viable path for the first link between the transmitter node and the relay node and a second beam training procedure to select the second beam pair providing the viable path for the second link between the relay node and the base station.

In a fourth aspect, alone or in combination with one or more of the first through third aspects, transmitting the estimate of the signal to the base station at least partially overlaps in time with the transmitter node transmitting the signal to the base station.

In a fifth aspect, alone or in combination with one or more of the first through fourth aspects, the signal is received from the transmitter node in a first slot, and the relay node transmits the estimate of the signal to the base station in a second slot concurrently with the transmitter node transmitting the signal to the base station in the second slot.

In a sixth aspect, alone or in combination with one or more of the first through fifth aspects, the relay node receives the signal from the transmitter node and forwards the estimate of the signal to the base station in a single slot.

In a seventh aspect, alone or in combination with one or more of the first through sixth aspects, the relay node amplifies the signal received from the transmitter node prior to transmitting the estimate of the signal to the base station.

In an eighth aspect, alone or in combination with one or more of the first through seventh aspects, the relay node determines the estimate of the signal based at least in part on the first complex channel estimate associated with the first beam pair.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
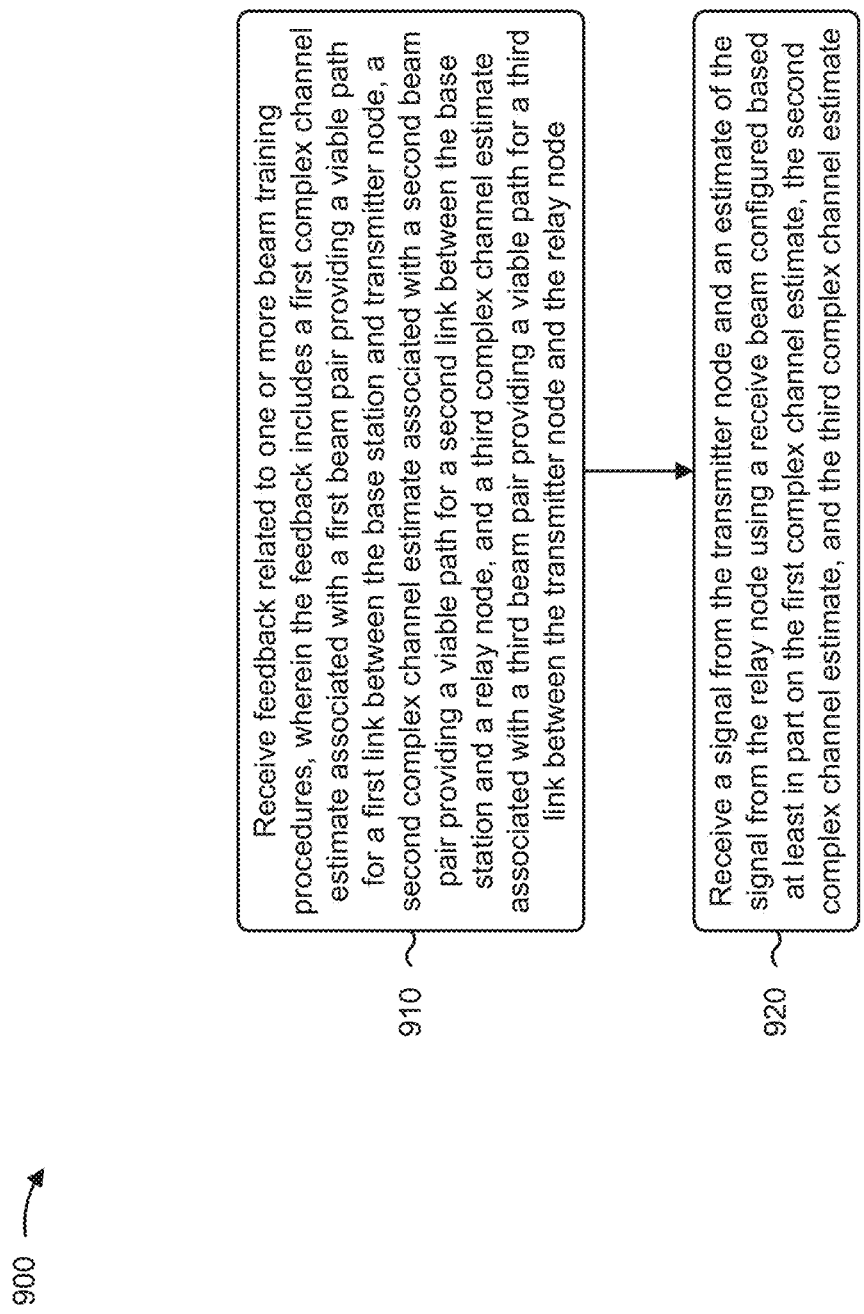
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where a base station (e.g., base station 110, base station 310, anchor base station 335, non-anchor base station 345, base station 506, and/or the like) performs operations that relate to beam training in mmW relays using amplify-and-forward transmissions.

As shown in FIG. 9, in some aspects, process 900 may include receiving feedback related to one or more beam training procedures, wherein the feedback includes a first complex channel estimate associated with a first beam pair providing a viable path for a first link between the base station and transmitter node, a second complex channel estimate associated with a second beam pair providing a viable path for a second link between the base station and a relay node, and a third complex channel estimate associated with a third beam pair providing a viable path for a third link between the transmitter node and the relay node (block 910). For example, the base station may receive (e.g., using antenna 234, DEMOD 232, MIMO detector 236, receive processor 238, controller/processor 240, architecture 400, and/or the like) feedback related to one or more beam training procedures, as described above, for example, with reference to FIGS. 5A, 5B, 5C, 5D, and/or 6. In some aspects, the feedback includes a first complex channel estimate associated with a first beam pair providing a viable path for a first link between the base station and transmitter node, a second complex channel estimate associated with a second beam pair providing a viable path for a second link between the base station and a relay node, and a third complex channel estimate associated with a third beam pair providing a viable path for a third link between the transmitter node and the relay node.

As further shown in FIG. 9, in some aspects, process 900 may include receiving a signal from the transmitter node and an estimate of the signal from the relay node using a receive beam configured based at least in part on the first complex channel estimate, the second complex channel estimate, and the third complex channel estimate (block 920). For example, the base station may receive (e.g., using antenna 234, DEMOD 232, MIMO detector 236, receive processor 238, controller/processor 240, architecture 400, and/or the like) a signal from the transmitter node and an estimate of the signal from the relay node using a receive beam configured based at least in part on the first complex channel estimate, the second complex channel estimate, and the third complex channel estimate, as described above, for example, with reference to base station receive beams g, $g_{opt}$, and/or the like in FIGS. 5A, 5B, 5C, 5D, and/or 6.

Process 900 may include additional aspects, such as any single aspect or any combination of aspects described below and/or in connection with one or more other processes described elsewhere herein.

In a first aspect, the first complex channel estimate relates to first power budget and a first beamforming gain associated with the first beam pair, wherein the second complex channel estimate relates to a second power budget and a second beamforming gain associated with the second beam pair, and wherein the third complex channel estimate relates to a third power budget and a third beamforming gain associated with the third beam pair.

In a second aspect, alone or in combination with the first aspect, the feedback related to the one or more beam training procedures further includes a reference signal received power and one or more beam indices associated with each of the first beam pair and the second beam pair.

In a third aspect, alone or in combination with one or more of the first and second aspects, the one or more beam training procedures include a first beam training procedure to select the first beam pair providing the viable path for the first link between the base station and the transmitter node, a second beam training procedure to select the second beam pair providing the viable path for the second link between the base station and the relay node, and a third beam training procedure to select the third beam pair providing the viable path for the third link between the transmitter node and the relay node.

In a fourth aspect, alone or in combination with one or more of the first through third aspects, the signal and the estimate of the signal are received via the receive beam within a single slot.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A relay node for wireless communication, comprising:
a memory; and
one or more processors, coupled to the memory, configured to:
  transmit, to a base station, feedback related to one or more beam training procedures, wherein the feedback includes a first complex channel estimate associated with a first beam pair providing a viable path for a first link between a transmitter node and the relay node and a second complex channel estimate associated with a second beam pair providing a viable path for a second link between the relay node and the base station;
  receive a signal from the transmitter node using a receive beam associated with the first beam pair; and
  transmit an estimate of the signal to the base station using a transmit beam associated with the second beam pair to enable the base station to simultaneously receive the signal from the transmitter node and the estimate of the signal from the relay node via a base station receive beam, wherein the base station receive beam is configured based at least in part on the first complex channel estimate, the second complex channel estimate, and a third complex channel estimate associated with a third beam pair configured on a third link between the transmitter node and the base station.

2. The relay node of claim 1, wherein the first complex channel estimate relates to a first power budget and a first beamforming gain associated with the first beam pair, and wherein the second complex channel estimate relates to a second power budget and a second beamforming gain associated with the second beam pair.

3. The relay node of claim 1, wherein the feedback related to the one or more beam training procedures further includes a reference signal received power and one or more beam indices associated with the second beam pair.

4. The relay node of claim 1, wherein the one or more beam training procedures include a first beam training procedure to select the first beam pair providing the viable path for the first link between the transmitter node and the relay node and a second beam training procedure to select the second beam pair providing the viable path for the second link between the relay node and the base station.

5. The relay node of claim 1, wherein transmitting the estimate of the signal to the base station at least partially overlaps in time with the transmitter node transmitting the signal to the base station.

6. The relay node of claim 5, wherein the signal is received from the transmitter node in a first slot, and wherein the relay node transmits the estimate of the signal to the base station in a second slot concurrently with the transmitter node transmitting the signal to the base station in the second slot.

7. The relay node of claim 5, wherein the relay node receives the signal from the transmitter node and forwards the estimate of the signal to the base station in a single slot.

8. The relay node of claim 1, wherein the one or more processors are further configured to:
  amplify the signal received from the transmitter node prior to transmitting the estimate of the signal to the base station.

9. The relay node of claim 1, wherein the one or more processors are further configured to:
  determine the estimate of the signal based at least in part on the first complex channel estimate associated with the first beam pair.

10. A method of wireless communication performed by a relay node, comprising:
  transmitting, to a base station, feedback related to one or more beam training procedures, wherein the feedback includes a first complex channel estimate associated with a first beam pair providing a viable path for a first link between a transmitter node and the relay node and a second complex channel estimate associated with a second beam pair providing a viable path for a second link between the relay node and the base station;
  receiving a signal from the transmitter node using a receive beam associated with the first beam pair; and
  transmitting an estimate of the signal to the base station using a transmit beam associated with the second beam pair to enable the base station to simultaneously receive the signal from the transmitter node and the estimate of the signal from the relay node via a base station receive beam, wherein the base station receive beam is configured based at least in part on the first complex channel estimate, the second complex channel estimate, and a third complex channel estimate associated with a third beam pair configured on a third link between the transmitter node and the base station.

11. The method of claim 10, wherein the first complex channel estimate relates to a first power budget and a first beamforming gain associated with the first beam pair, and wherein the second complex channel estimate relates to a second power budget and a second beamforming gain associated with the second beam pair.

12. The method of claim 10, wherein the feedback related to the one or more beam training procedures further includes a reference signal received power and one or more beam indices associated with the second beam pair.

13. The method of claim 10, wherein the one or more beam training procedures include a first beam training procedure to select the first beam pair providing the viable path for the first link between the transmitter node and the relay node and a second beam training procedure to select the second beam pair providing the viable path for the second link between the relay node and the base station.

14. The method of claim 10, wherein transmitting the estimate of the signal to the base station at least partially overlaps in time with the transmitter node transmitting the signal to the base station.

15. The method of claim 14, wherein the signal is received from the transmitter node in a first slot, and wherein the relay node transmits the estimate of the signal to the base station in a second slot concurrently with the transmitter node transmitting the signal to the base station in the second slot.

16. The method of claim 14, wherein the relay node receives the signal from the transmitter node and forwards the estimate of the signal to the base station in a single slot.

17. The method of claim 10, further comprising:
amplifying the signal received from the transmitter node prior to transmitting the estimate of the signal to the base station.

18. The method of claim 10, further comprising:
determining the estimate of the signal based at least in part on the first complex channel estimate associated with the first beam pair.

19. A base station for wireless communication, comprising:
a memory; and
one or more processors, coupled to the memory, configured to:
receive feedback related to one or more beam training procedures, wherein the feedback includes a first complex channel estimate associated with a first beam pair providing a viable path for a first link between the base station and a transmitter node, a second complex channel estimate associated with a second beam pair providing a viable path for a second link between the base station and a relay node, and a third complex channel estimate associated with a third beam pair providing a viable path for a third link between the transmitter node and the relay node; and
receive a signal from the transmitter node and an estimate of the signal from the relay node using a receive beam configured based at least in part on the first complex channel estimate, the second complex channel estimate, and the third complex channel estimate.

20. The base station of claim 19, wherein the first complex channel estimate relates to a first power budget and a first beamforming gain associated with the first beam pair, wherein the second complex channel estimate relates to a second power budget and a second beamforming gain associated with the second beam pair, and wherein the third complex channel estimate relates to a third power budget and a third beamforming gain associated with the third beam pair.

21. The base station of claim 19, wherein the feedback related to the one or more beam training procedures further includes a reference signal received power and one or more beam indices associated with each of the first beam pair and the second beam pair.

22. The base station of claim 19, wherein the one or more beam training procedures include a first beam training procedure to select the first beam pair providing the viable path for the first link between the base station and the transmitter node, a second beam training procedure to select the second beam pair providing the viable path for the second link between the base station and the relay node, and a third beam training procedure to select the third beam pair providing the viable path for the third link between the transmitter node and the relay node.

23. The base station of claim 19, wherein the signal and the estimate of the signal are received via the receive beam within a single slot.

24. A method of wireless communication performed by a base station, comprising:
receiving feedback related to one or more beam training procedures, wherein the feedback includes a first complex channel estimate associated with a first beam pair providing a viable path for a first link between the base station and a transmitter node, a second complex channel estimate associated with a second beam pair providing a viable path for a second link between the base station and a relay node, and a third complex channel estimate associated with a third beam pair providing a viable path for a third link between the transmitter node and the relay node; and
receiving a signal from the transmitter node and an estimate of the signal from the relay node using a receive beam configured based at least in part on the first complex channel estimate, the second complex channel estimate, and the third complex channel estimate.

25. The method of claim 24, wherein the first complex channel estimate relates to a first power budget and a first beamforming gain associated with the first beam pair, wherein the second complex channel estimate relates to a second power budget and a second beamforming gain associated with the second beam pair, and wherein the third complex channel estimate relates to a third power budget and a third beamforming gain associated with the third beam pair.

26. The method of claim 24, wherein the feedback related to the one or more beam training procedures further includes a reference signal received power and one or more beam indices associated with each of the first beam pair and the second beam pair.

27. The method of claim 24, wherein the one or more beam training procedures include a first beam training procedure to select the first beam pair providing the viable path for the first link between the base station and the transmitter node, a second beam training procedure to select the second beam pair providing the viable path for the second link between the base station and the relay node, and a third beam training procedure to select the third beam pair providing the viable path for the third link between the transmitter node and the relay node.

28. The method of claim 24, wherein the signal and the estimate of the signal are received via the receive beam within a single slot.

29. The method of claim 24, wherein the feedback related to the one or more beam training procedures includes at least one of:
first feedback, from the transmitter node, associated with the first beam pair,
second feedback, from the relay node, associated with the second bream pair, or
third feedback, from at least one of the transmitter node or the relay node, associated with the third beam pair.

30. The method of claim 24, wherein the receive beam is configured by the base station.

* * * * *